United States Patent
Endoh et al.

(10) Patent No.: US 6,204,889 B1
(45) Date of Patent: *Mar. 20, 2001

(54) IMAGE INFORMATION PROCESSING APPARATUS

(75) Inventors: Shozo Endoh, Kawasaki; Yasuyuki Oiwa, Tokyo, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/766,497

(22) Filed: Dec. 13, 1996

(30) Foreign Application Priority Data

Dec. 15, 1995 (JP) .................................. 7-347147
Dec. 15, 1995 (JP) .................................. 7-347148

(51) Int. Cl.⁷ ........................................ H04N 1/56
(52) U.S. Cl. ................................ 348/571; 348/231
(58) Field of Search ........................ 348/571, 231–233, 348/420, 423, 382, 235, 384, 390, 405, 410, 208, 476, 477; 375/372; 395/856, 898, 891, 200.77

(56) References Cited

U.S. PATENT DOCUMENTS

| | | | |
|---|---|---|---|
| 4,270,183 | * 5/1981 | Robinson et al. | 364/900 |
| 4,596,026 | * 6/1986 | Cease et al. | 375/372 |
| 4,651,209 | * 3/1987 | Okada | 348/725 |
| 4,660,096 | * 4/1987 | Arlan et al. | 348/231 |
| 4,729,021 | * 3/1988 | Kondo | 358/135 |
| 5,043,816 | * 8/1991 | Nakano et al. | 358/209 |
| 5,253,075 | * 10/1993 | Sugiyama | 358/261.2 |
| 5,276,514 | * 1/1994 | Hyun | 348/571 |
| 5,283,577 | * 2/1994 | Coenen | 341/95 |
| 5,301,026 | * 4/1994 | Lee | 348/231 |
| 5,323,237 | * 6/1994 | Oda | 348/725 |
| 5,402,488 | * 3/1995 | Karlock | 348/725 |
| 5,414,464 | * 5/1995 | Sasaki | 348/231 |
| 5,485,284 | * 1/1996 | Shono et al. | 358/504 |
| 5,583,894 | * 12/1996 | Linsley | 375/372 |
| 5,740,372 | * 4/1998 | Hijino | 395/898 |

OTHER PUBLICATIONS (John Lenk: Handbook of Data Communications; pp. 4–18, 52–54 & 282–291), 1984.*
(Elizabeth Nichols, et al; Data Communications for Microcomputers; pp. 17–23 & 53–55), 1982.*
(Fred Halsall; Public Carrier Circuits; Data Communications, Computer Networks and Open Systems; pp. 70–72, p. 102, pp. 107–108), 1996.*

* cited by examiner

*Primary Examiner*—Andrew Faile
*Assistant Examiner*—Reuben Brown

(57) ABSTRACT

An image information processing apparatus of this invention receives an information signal, converts the input information signal into digital data, temporarily stores the converted digital data, parallel/serial-converts the temporarily stored digital data, and controls the operation of the parallel/serial processing in accordance with the contents of information indicated by the temporarily stored digital data when the parallel/serial-converted digital data is converted into an analog signal and the analog signal is transmitted onto the transmission path, thereby allowing easy transmission of image information and a control code using a smaller number of transmission path and realizing a cost reduction.

12 Claims, 23 Drawing Sheets

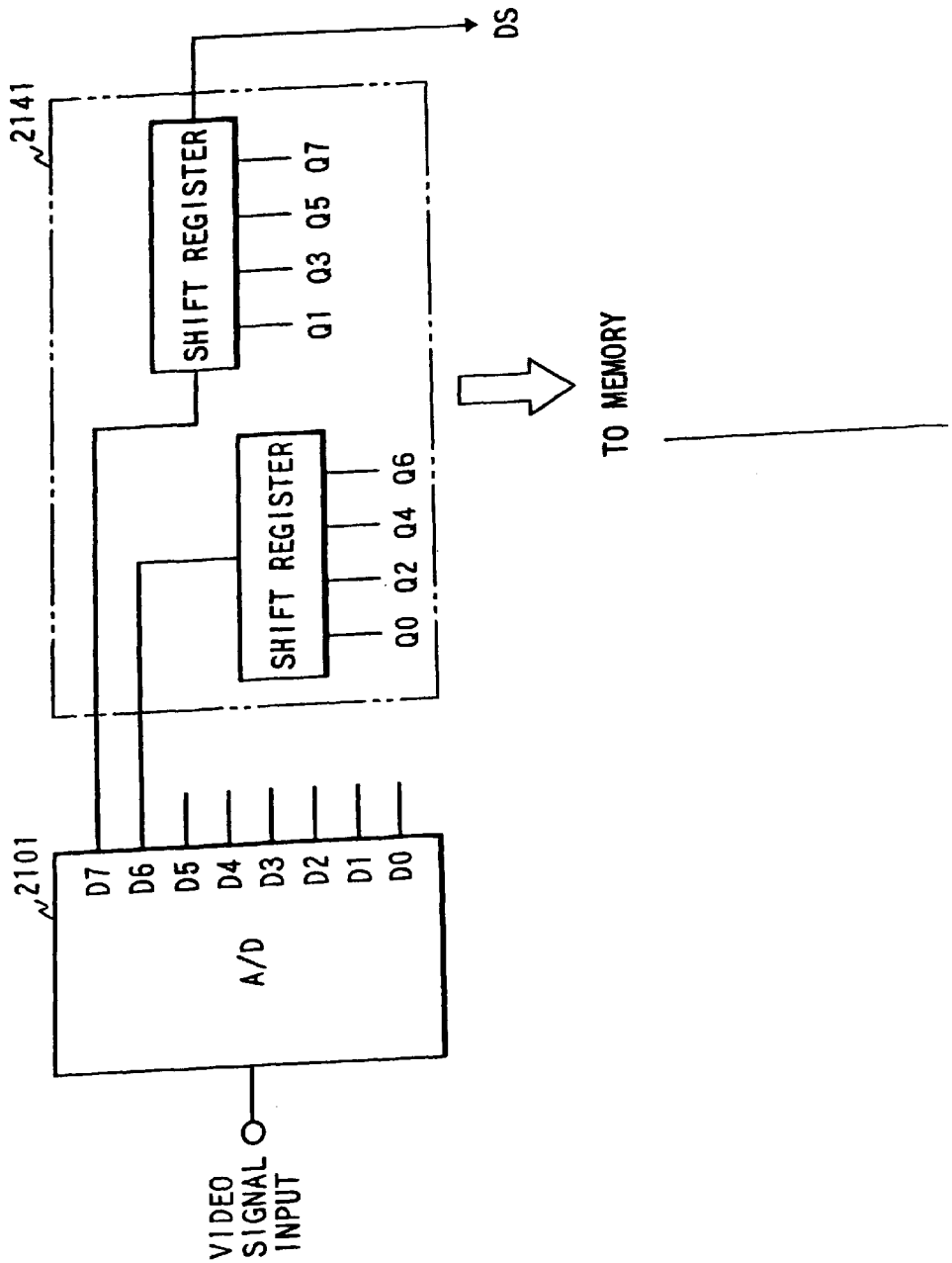

IMAGE INFORMATION PROCESSING APPARATUS

BACKGROUND OF THE INVENTION

1. Field of the Invention

The present invention relates to an image information processing apparatus for processing image information.

2. Related Background Art

As an image information processing apparatus for processing image information, a data communication system that transmits/receives image data is known.

FIG. 1 is a block diagram showing the arrangement of a conventional data communication system. Referring to FIG. 1, a transmission apparatus 100a and a receiving apparatus 200a constitute the data communication system.

The transmission apparatus 100a comprises an A/D converter 1a for converting a video signal input from an image input device such as a camera into digital data. The apparatus 100a also comprises a memory 2a for temporarily storing digital data and a D/A converter 3a for converting digital data into analog data.

The apparatus 100a further comprises transmission buffers 4a, 5a, and 6a for respectively performing impedance matching of communication lines 9a, 10a, and 11a, a memory controller 7a for controlling data read/write accesses to the memory 2a, and a clock generator 8a for generating clocks to be supplied to the A/D converter 1a, the D/A converter 3a, and the memory 2a. The apparatus 100a is connected to the receiving apparatus 200a via the communication lines 9a, 10a, and 11a.

The receiving apparatus 200a comprises reception buffers 12a, 13a, and 14a for respectively performing impedance matching of the communication lines 9a, 10a, and 11a, a clamp circuit 15a for converting a signal into a level suitable for an A/D converter 16a on its output side, and a memory 17a for temporarily storing received data.

The operation of the data communication system will be described below. A video signal input to the A/D converter 1a is converted by the A/D converter 1a into a digital signal. The converted digital signal is input to and temporarily stored in the memory 2a. Note that digital data can be directly input to the memory 2a using an external device.

The memory controller 7a controls the read/write accesses to the memory 2a in accordance with a user's request. The memory 2a, the read/write accesses to which are controlled by the memory controller 7a, outputs data according to the user's request. Data output from the memory 2a is input to the D/A converter 3a, and is converted into an analog signal.

The clock generator 8a outputs clocks for performing A/D conversion to the A/D converter 1a, clocks for controlling the read/write accesses to the memory 2a, and clocks for performing D/A conversion to the D/A converter 3a.

The analog signal D/A-converted by the D/A converter 3a is input to the transmission buffer 4a. The transmission buffer 4a performs impedance matching by amplifying the input analog signal by 6 dB, and sends the analog signal to the reception buffer 12a of the receiving apparatus 200a via the communication line 9a.

The clocks supplied to the A/D converter 1a, memory 2a, and D/A converter 3a are similarly input to the transmission buffer 5a. The transmission buffer 5a performs impedance matching by amplifying the clocks by 6 dB, and sends them to the reception buffer 13a via the communication line 10a.

The analog signal transmitted from the transmission buffer 4a is received by the reception buffer 12a. The clamp circuit 15a converts the received analog signal to a level suitable for A/D conversion. The signal clamped by the clamp circuit 15a is input to the A/D converter 16a, and is converted into a digital signal. The digital signal is then input to the memory 17a.

The clocks generated by the clock generator 8a are transmitted via the communication line 10a and are received by the reception buffer 13a. These clocks are supplied as those for the A/D converter 16a or those for storing data in the memory 17a.

On the other hand, data output from the memory 2a is sent to the reception buffer 14a via the communication line 11a. The reception buffer 14a outputs the data to the memory 17a and stores it therein.

FIG. 2 is a circuit diagram showing the arrangements of the transmission buffer 4a and the reception buffer 12a. Since the transmission buffer 5a and the reception buffer 13a respectively have the same arrangements as those of the transmission buffer 4a and the reception buffer 12a, a detailed description thereof will be omitted. Referring to FIG. 2, the transmission buffer 4a comprises a transmission operational amplifier 18a and a termination resistor 19a. Also, the buffer 4a comprises a feedback resistor Rf 20a and an input resistor Ri 21a. The reception buffer 13a comprises a termination resistor 22a and a reception operational amplifier 23a. A signal input to the transmission buffer 4a is input to the operational amplifier 18a. Note that the feedback resistor (Rf) 20a and the input resistor (Ri) 21a have the same resistance. At this time, the amplification factor of the operation amplifier 18a is 2×, and a gain of 6 dB is obtained. The termination resistors 22a and 19a respectively have a resistance of 75 Ω. The signal output from the operational amplifier 18a is input to the operational amplifier 23a via the communication line 9a, which is terminated by the termination resistors 19a and 22a. The signal input to the reception operational amplifier 23a is amplified to a gain of 1× by a voltage-follower circuit, and is output to the next stage.

However, the conventional data communication system suffers the following problems. That is, in order to communicate signals such as data, clocks, and the like via the communication lines, the corresponding communication lines, transmission buffers, and reception buffers are required. As a consequence, the size of the data communication system increases, and the number of communication lines increases.

As another conventional image information processing apparatus, an image input apparatus, which fetches an image using a solid-state imaging element such as a CCD and outputs the image to display it on a monitor or to store it in a memory after digital conversion is known. FIG. 3 is a block diagram showing the arrangement of the conventional image input apparatus. Referring to FIG. 3, the apparatus comprises a lens 1201, an aperture portion 1202, an optical low-pass filter 1203 with a complementary color mosaic pattern, a CCD 1204, a gain amplifier 1205, and an A/D conversion circuit 1206.

The apparatus also comprises a memory A 1207, a memory B 1208, an operation processing circuit 1209, a selector 1210, a look-up table (LUT) 1211, a D/A conversion circuit 1212, a memory controller 1213, a CPU 1214, and a timing generator 1215.

In the image input apparatus with the above-mentioned arrangement, an image signal input via the lens 1201 passes through the aperture portion 1202 and the optical low-pass filter 1203, and is supplied to the CCD 1204. A charge accumulated on the CCD 1204 is read out as an optical image electrical signal by driving the CCD 1204 in accordance with a control signal from the timing generator 1215, and the readout electrical signal is amplified by the gain amplifier 1205. Thereafter, the amplified electrical signal is output.

The gain amplifier 1205 is level-controlled by a signal from the timing generator 1215, which is controlled by the CPU 1214.

The output signal from the gain amplifier 1205 is converted into a digital signal by the A/D conversion circuit 1206, and is stored in the memory A 1207 as cyan (Cy), magenta (Mg), yellow (Ye), and green (G) data. On the other hand, the memory B 1208 stores dark signal data. The dark signal data is the one obtained from the CCD 1204 in the light-shielded state by closing the aperture portion 1202 upon resetting the system. The memories A 1207 and B 1208 are respectively controlled by the memory controller 1213.

The operation processing circuit 1209 subtracts the dark signal data read out from the memory B 1208 from the complementary color image data read out from the memory A 1207. The operation result is converted from cyan, magenta, and yellow data into a luminance signal (U) and color difference signals (Cr, Cb) by a matrix operation based on a 3×3 coefficient A given by the following equation (1):

$$\begin{bmatrix} Y \\ Cr \\ Cb \end{bmatrix} = A_{33} \begin{bmatrix} Cy \\ Mg \\ Ye \end{bmatrix} \quad (1)$$

Data converted into the luminance signal and the color difference signals are supplied to the selector 1210. The selector 1210 is controlled by the CPU 1214. The selector 1211 determines one to be selected of some data tables of the subsequent LUT 1211.

FIG. 4 is a graph showing the γ conversion table data of the LUT 1211. When this data table has some γ curves, arbitrary outputs can be obtained. The table data may be those other than γ conversion.

The output from the LUT 1211 is supplied to the D/A conversion circuit 1212, and is re-converted from digital data to analog data. The analog data is output as a video signal to an external circuit. The output video signal is directly displayed on a monitor or is stored at an arbitrary location after predetermined processing.

In the latter case, the video signal is processed as an analog signal or after it is converted into a digital signal. In the following description, an image processing apparatus that performs digital image processing will be briefly exemplified.

FIG. 5 is a block diagram showing the arrangement of an image processing apparatus. The image processing apparatus and the above-mentioned image input apparatus are connected via a signal line and a control line. Referring to FIG. 5, an input signal from the image input apparatus is converted into a digital signal by an A/D conversion circuit 1101, and the digital signal is supplied to a digital signal processing circuit 1103 or a switch 1107. When an input image data is stored in a memory 1110 through the switch 1107, it is written in the memory 1110 controlled by a memory controller 1106. Similarly, the read control of the memory 1110 is performed by the memory controller 1106.

On the other hand, the digital signal processing circuit 1103 is a circuit for converting the luminance signal and the color difference signals into R, G, and B signals or a circuit for performing digital operation processing. When the output from the digital signal processing circuit 1103 is selected by the switch 1107, the processed data is written in the memory 1110.

However, although the conventional image processing apparatus processes a digital signal as in the image input apparatus, input/output units that connect the two apparatuses transmit/receive an analog signal. Therefore, upon digital-to-analog (D/A) conversion and analog-to-digital (A/D) conversion for transmitting image data, the image data may deteriorate.

In order to solve this problem, when another input/output units that can exchange digital data are added, the number of parts of the apparatus increases to increase cost, and the number of processing steps increases.

Image data may be transferred using the control line. However, the control line is not suitable for transferring the image data since it has a maximum data transfer rate of 1 to 2 Mbps.

SUMMARY OF THE INVENTION

It is an object of the present invention to provide an image information processing apparatus which can solve the above-mentioned problems.

It is another object of the present invention to provide an image processing apparatus which can easily transmit image information and control codes using a smaller number of transmission paths and can reduce cost.

In order to achieve the above objects, according to one embodiment of the present invention, an image information processing apparatus comprises:

conversion means for receiving an information signal, converting the input information signal into digital data, and parallelly outputting the digital data;

temporary storage means for temporarily storing the digital data parallelly output from the conversion means, and parallelly outputting the temporarily stored digital data;

parallel input/serial output means for parallelly receiving the digital data parallelly output from the temporary storage means, and serially outputting the input digital data;

output means for converting the digital data output from the parallel input/serial output means into an analog signal, and outputting the analog signal onto a transmission path; and operation control means for controlling an operation of the parallel input/serial output means in accordance with contents of information indicated by the digital data output from the temporary storage means.

It is still another object of the present invention to provide an image information processing apparatus which can transmit a control code at high speed using a transmission path for transmitting image information.

In order to achieve the above object, according to one embodiment of the present invention, an image information processing apparatus comprises:

conversion means for receiving an analog signal supplied via a transmission path, converting the input analog signal into digital data, and serially outputting the digital data;

serial input/parallel output means for serially receiving the digital data serially output from the conversion means, and parallelly outputting the input digital data;

storage means for storing the digital data parallelly output from the serial input/parallel output means; and operation control means for controlling an operation of the serial input/parallel output means in accordance with contents of information indicated by the analog signal input to the conversion means.

It is still another object of the present invention to provide an image information processing apparatus which can transmit a video signal and a control code using a single transmission path.

In order to achieve the above object, according to one embodiment of the present invention, an image information processing apparatus comprises:

analog/digital conversion means for receiving an analog video signal, converting the input analog video signal into digital data, and parallelly outputting the digital data;

data generation means for generating digital data indicating various control codes;

temporary storage means for temporarily storing the digital data parallelly output from the analog/digital conversion means or the digital data generated by the data generation means, and parallelly outputting the temporarily stored digital data;

parallel input/serial output means for parallelly receiving the digital data parallelly output from the temporary storage means, and serially outputting the input digital data;

digital/analog conversion means for converting the digital data serially output from the parallel input/serial output means, and outputting the analog signal;

analog signal transmission means for transmitting the analog signal output from the digital/analog conversion means via a transmission path;

reception means for receiving the analog signal transmitted from the analog signal transmission means via the transmission path; and operation control means for controlling an operation of the parallel input/serial output means in accordance with contents of information indicated by the digital data output from the temporary storage means.

It is still another object of the present invention to provide an image information processing apparatus which can transmit image information at high speed without deteriorating it.

In order to achieve the above object, according to one embodiment of the present invention, an image information processing apparatus comprises:

divisional output means for receiving digital image data, dividing the input digital image data into data each having a predetermined number of bits, and outputting the divided data;

data conversion means for receiving the data each having the predetermined number of bits output from the divisional output means, and outputting conversion data corresponding to the input data;

digital/analog conversion means for converting the conversion data output from the data conversion means into an analog signal, and outputting the analog signal;

analog signal transmission means for transmitting the analog signal output from the digital/analog conversion means via a transmission path;

reception means for receiving the analog signal transmitted from the analog signal transmission means via the transmission path;

analog/digital conversion means for converting the analog signal received by the reception means into digital data, and outputting the digital data; and data inverse conversion means for receiving the digital data output from the analog/digital conversion means, and outputting the data before conversion in the data conversion means corresponding to the input digital data.

The above and other objects and features of the present invention will become apparent from the following detailed description of the embodiments of the present invention taken in conjunction with the accompanying drawings.

BRIEF DESCRIPTION OF THE DRAWINGS

FIG. 29 is a block diagram showing the arrangement of a serial-parallel conversion circuit shown in FIG. 28.

DETAILED DESCRIPTION OF THE PREFERRED EMBODIMENTS

An embodiment of a data communication system as one example of an image information processing apparatus according to the present invention will be described hereinafter.

Figure 6:
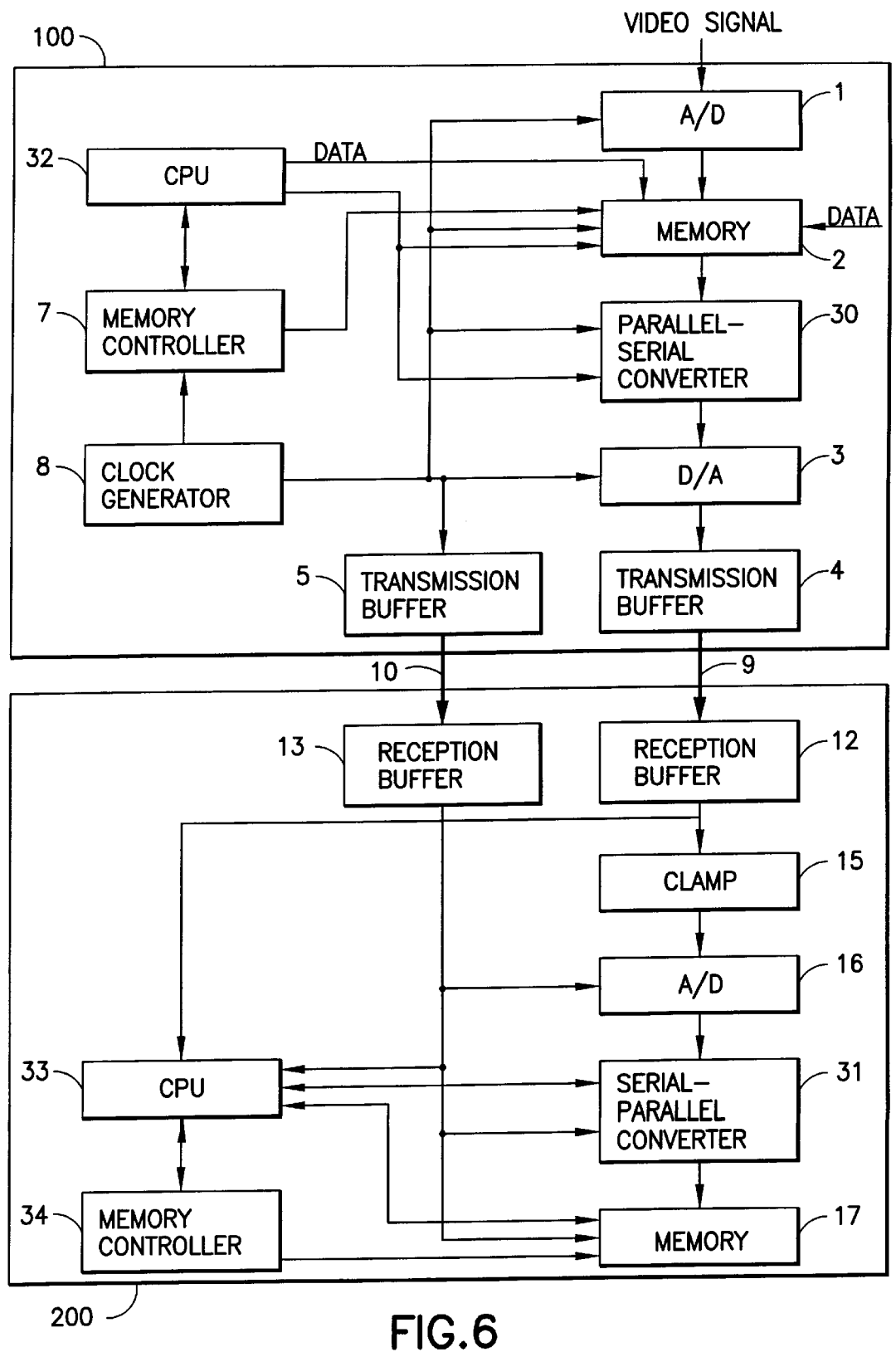
FIG. 6 is a block diagram showing the arrangement of a data communication system according to the first embodiment of the present invention.

FIG. 6 is a block diagram showing the arrangement of a data communication system according to the first embodiment of the present invention. Referring to FIG. 6, the system comprises a transmission apparatus 100 and a receiving apparatus 200.

An A/D converter 1 converts a video signal input from an image input device such as a camera into digital data. A memory 2 temporarily stores digital data. A D/A converter 3 converts digital data into an analog signal. Transmission buffers 4 and 5 perform impedance matching of communication lines 9 and 10 upon transmitting data and clocks.

A memory controller 7 controls data read/write accesses to the memory 2. A clock generator 8 generates clocks to be supplied to the A/D converter 1, the D/A converter 3, and the memory 2. The communication lines 9 and 10 are respectively used for transmitting data and clocks.

Reception buffers 12 and 13 perform impedance matching of the communication lines 9 and 10 for receiving data and clocks.

A clamp circuit 15 converts a signal to a level suitable for an A/D converter 16 at its output side, and the A/D converter 16 converts the received analog signal into digital data. A memory 17 temporarily stores the converted digital data. A parallel-serial (P/S) converter 30 P/S-converts the digital data from the memory 2, and a serial-parallel (S/P) converter 31 S/P-converts the digital data from the A/D converter 16.

A CPU 32 controls the memory controller 7 and the P/S converter 30, and outputs data to the memory 2. A CPU 33 on the receiving side controls the S/P converter 31 and a memory controller 34, and reads/writes data to/from the memory 17. The read/write accesses to the memory 17 are controlled by the memory controller 34.

The operation of the data communication system with the above arrangement will be explained below. A video signal input to the A/D converter 1 is converted into digital data in accordance with the clocks generated by the clock generator 8. The converted digital data is input to the memory 2 and is temporarily stored therein. Note that digital data can be directly input to the memory 2 by an external device. In this embodiment, the CPU 32 writes digital data in the memory 2.

In order to control the data read/write accesses to the memory 2 in accordance with a user's request, the memory controller 7 controls the memory 2. The memory 2, which is controlled by the memory controller 7, outputs digital data in accordance with the request. Data output from the memory 2 is P/S-converted by the P/S converter 30 as needed. At this time, the CPU 32 selects whether data is supplied to the D/A converter 3 as parallel or serial data.

Upon outputting a video signal via the communication line 9, the P/S converter 30 outputs parallel data to the D/A converter 3 without S/P-converting it in accordance with a command from the CPU 32. The D/A converter 3 converts, e.g., 8-bit digital data into an analog signal on the basis of the clocks generated by the clock generator 8, and transfers it as a video signal to the transmission buffer 4.

The transmission buffer 4 transmits the received video signal to the reception buffer 12 of the receiving apparatus 200 via the communication line 9 which is terminated at 74 Ω. The reception buffer 12 is terminated at 75 Ω, and outputs the received video signal to the subsequent clamp circuit 15.

The clamp circuit 15 converts the video signal into a level suitable for the A/D converter 16, and outputs the converted signal thereto. The A/D converter 16 converts the input video signal into digital data on the basis of the clocks sent from the reception buffer 13, and outputs the digital data to the S/P converter 31. The S/P converter 31 outputs the received data to the memory 17 without any S/P conversion in accordance with a command from the CPU 33. The output non-converted digital data is stored in the memory 17 controlled by the memory controller 34.

On the other hand, when the P/S converter 30 converts digital data into serial data, the digital data read out from the memory 2 is P/S-converted by the P/S converter 30 in accordance with a command from the CPU 32, and serial data is output to the D/A converter 3.

The D/A converter 3 D/A-converts the received serial data, and outputs the video signal input to the A/D converter 1 or data directly written in the memory 2 by the CPU 32, an external computer, or the like to the transmission buffer 4. The transmission buffer 4 transmits the received video signal to the reception buffer 12 of the receiving apparatus 200 via the communication line 9 terminated at 75 Ω.

The reception buffer 12 is also terminated at 75 Ω, and outputs the received video signal to the next clamp circuit 15. The clamp circuit 15 converts the input signal to a level suitable for the subsequent A/D converter 16.

The A/D converter 16 converts the input analog signal into digital data, and outputs the digital data to the S/P converter 31. The S/P converter performs S/P conversion in accordance with a request from the CPU 33, and stores the converted parallel data in the memory 17 controlled by the memory controller 34.

Figure 7:
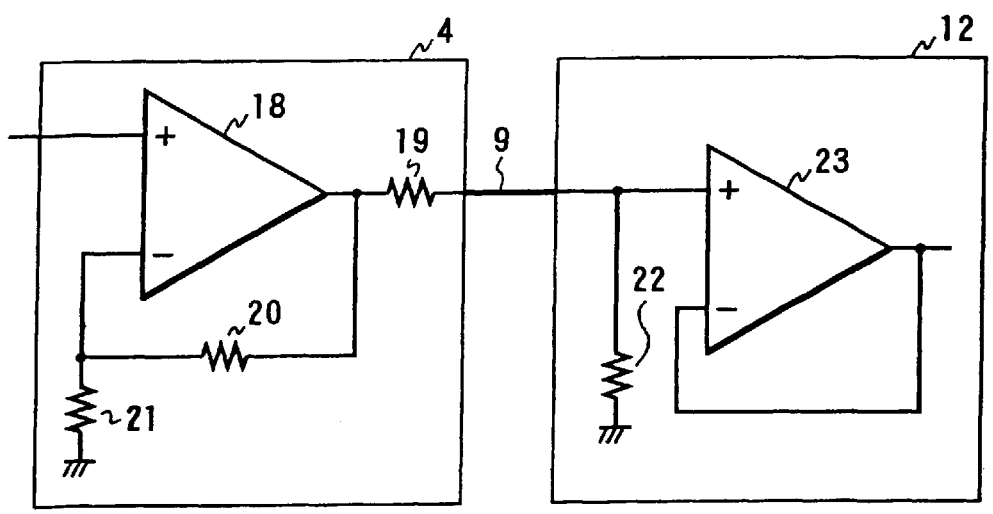
FIG. 7 is a circuit diagram showing the arrangements of a communication buffer and a reception buffer shown in FIG. 6.

FIG. 7 is a circuit diagram showing the arrangements of the transmission buffer 4 and the reception buffer 12. Referring to FIG. 7, the transmission buffer 4 comprises an operation amplifier 18 for transmission, a termination resistor 19, a feedback resistor Rf 20, and an input resistor Ri 21. The reception buffer 12 comprises a termination resistor 22 and an operational amplifier 23 for reception. A signal input to the transmission buffer 4 is input to the operational amplifier 18. Note that the feedback resistor (Rf) 20 and the input resistor (Ri) 21 have the same resistance. At this time, the amplification factor of the operational amplifier 18 is 2×, and a gain of 6 [db] is obtained. The termination resistors 22 and 19 respectively have a resistance of 75 Ω. The signal output from the operational amplifier 18 is input to the operational amplifier 23 via the communication line 9 terminated by the termination resistors 19 and 22. The signal input to the operational amplifier 23 is amplified by a gain of 1× by a voltage-follower circuit, and is output to the next stage.

Figure 8:
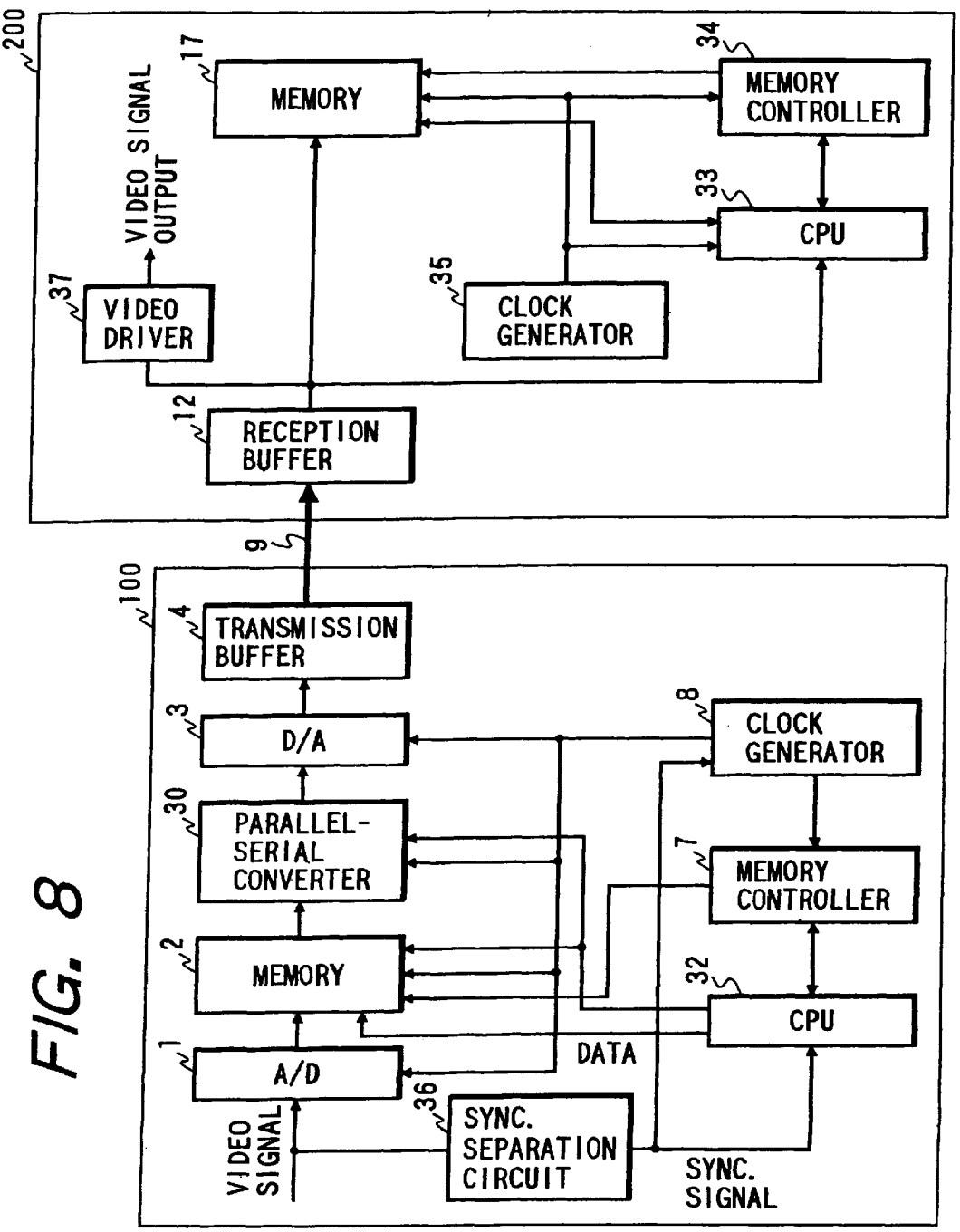
FIG. 8 is a block diagram showing the arrangement of a data communication system according to the second embodiment of the present invention.

FIG. 8 is a block diagram showing the arrangement of a data communication system according to the second embodiment of the present invention. The same reference numerals in FIG. 8 denote the same parts as in the first embodiment. Referring to FIG. 8, the system comprises a transmission apparatus 100 and a receiving apparatus 200.

An A/D converter 1 converts a video signal input from an image input device such as a camera into digital data. A memory 2 temporarily stores digital data. A D/A converter 3 converts digital data into an analog signal. A transmission buffer 4 performs impedance matching of a communication line 9 upon transmitting data.

A memory controller 7 controls data read/write accesses to the memory 2. A clock generator 8 generates clocks to be supplied to the A/D converter 1, the D/A converter 3, and the memory 2. The communication line 9 is used for transmitting data.

A reception buffer 12 performs impedance matching of the communication line 9 upon receiving data. A memory 17 temporarily stores the received data. A P/S converter 30 P/S-converts the digital data from the memory 2. A CPU 32 controls the memory controller 7 and the P/S converter 30, and outputs data to the memory 2. A CPU 33 on the receiving side controls a memory controller 34 to read/write data to/from the memory 17. The memory controller 34 controls the read/write accesses to the memory 17. A clock generator 35 generates clocks on the receiving side. A sync. separation circuit 36 separates a sync. signal from the input video signal. A video driver 37 outputs the video signal received by the reception buffer 12 to, e.g., an external monitor.

The operation of the data communication system with the above arrangement will be explained below. A video signal input to the A/D converter 1 is converted into digital data in accordance with the clocks generated by the clock generator 8. The converted digital data is input to the memory 2 and is temporarily stored therein. Note that digital data can be directly input to the memory 2 by an external device. In this embodiment, the CPU 32 writes digital data in the memory 2.

A sync. signal separated by the sync. separation circuit 36 is supplied to the CPU 32 and the clock generator 8, and is used in the timing control upon executing S/P conversion by the CPU 32. On the other hand, the clock generator 8 controls the clocks to be output to the A/D converter 3 on the basis of the input sync. signal.

The memory controller 7 controls the read/write accesses to the memory 2 in accordance with a user's request. The memory 2, which is controlled by the memory controller 7, outputs digital data in accordance with the request. Digital data output from the memory 2 is P/S-converted as needed. At this time, the CPU 32 selects whether data is supplied to the D/A converter 3 as parallel or serial data.

Upon outputting a video signal via the communication line 9, the P/S converter 30 outputs digital data to the D/A converter 3 without S/P-converting it in accordance with a command from the CPU 32. The D/A converter 3 converts 8-bit digital data into an analog signal on the basis of the clocks generated by the clock generator 8, and transfers it as a video signal to the transmission buffer 4.

The transmission buffer 4 transmits the received video signal to the reception buffer 12 via the communication line 9 which is terminated at 75 Ω. The reception buffer 12 is also terminated at 75 Ω, and outputs the received video signal to the subsequent circuit. Since the output data from the reception buffer 12 has a video signal format, the memory controller 34 inhibits write accesses to the memory 17 in accordance with a request from the CPU 33. The video signal output from the reception buffer 12 is input to the video driver 37, and is then output to an external device such as a monitor. Since the video driver 37 has substantially the same arrangement as that of the transmission buffer 4, the receiving apparatus 200 can be cascade-connected to the video output.

Figure 9:
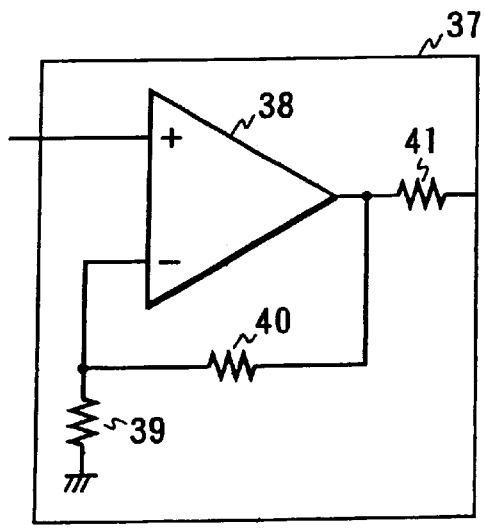
FIG. 9 is a circuit diagram showing the arrangement of a video driver shown in FIG. 8.

FIG. 9 is a circuit diagram showing the arrangement of the video driver 37. Referring to FIG. 9, the video driver 37 comprises an operational amplifier 38 for transmission, a feedback resistor Rf 40, an input resistor Ri 39, and a termination resistor 41. A signal input to the video driver 37 is input to the operational amplifier 38. Note that the feedback resistor Rf 40 and the input resistor Ri have the same resistance. Therefore, the amplification factor of the operational amplifier 38 is 2×, and a gain of 6 [db] is obtained. The output from the operational amplifier 38 is output to the subsequent circuit via the termination resistor 41 having a resistance of 75 Ω.

Figure 10:
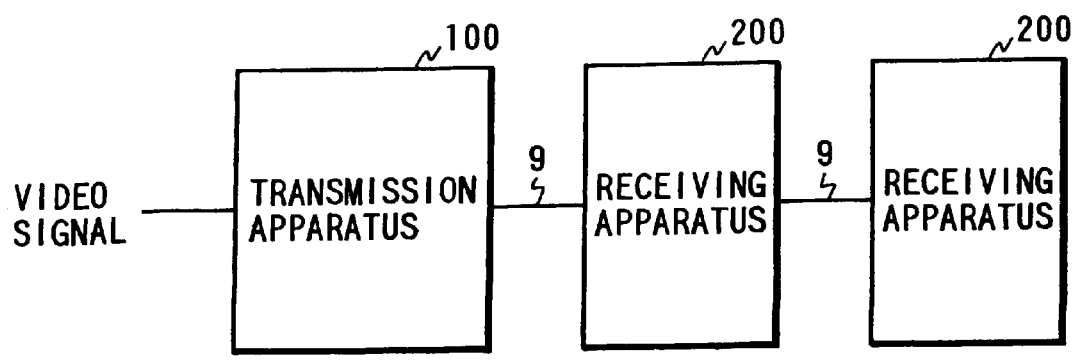
FIG. 10 is a block diagram showing cascade-connected receiving apparatuses.

FIG. 10 is a block diagram showing the cascade-connected receiving apparatuses. In this manner, since the video driver 37 has substantially the same arrangement as that of the transmission buffer 4 in the transmission apparatus 100, it may replace the transmission buffer 4. More specifically, the transmission apparatus 100 is connected to the receiving apparatus 200 via the communication line 9, and the video driver 37 of the receiving apparatus 200 can be connected to another receiving apparatus 200 via the communication line 9.

On the other hand, when the P/S converter 30 P/S-converts data, parallel data read out from the memory 2 is P/S-converted, and the serial data is output to the D/A converter 3 under the control of the CPU 32.

The D/A converter 3 D/A-converts the received serial data, and outputs the video signal input to the A/D converter 1 or data directly written in the memory 2 by the CPU 32, an external computer, or the like to the transmission buffer 4.

The transmission buffer 4 transmits the received video signal to the reception buffer 12 via the communication line 9 terminated at 75 Ω. The reception buffer 12 is also terminated at 75 Ω, and directly stores the input serial data in the memory 17 controlled by the memory controller 34 in accordance with a request from the CPU 33.

Figure 11:
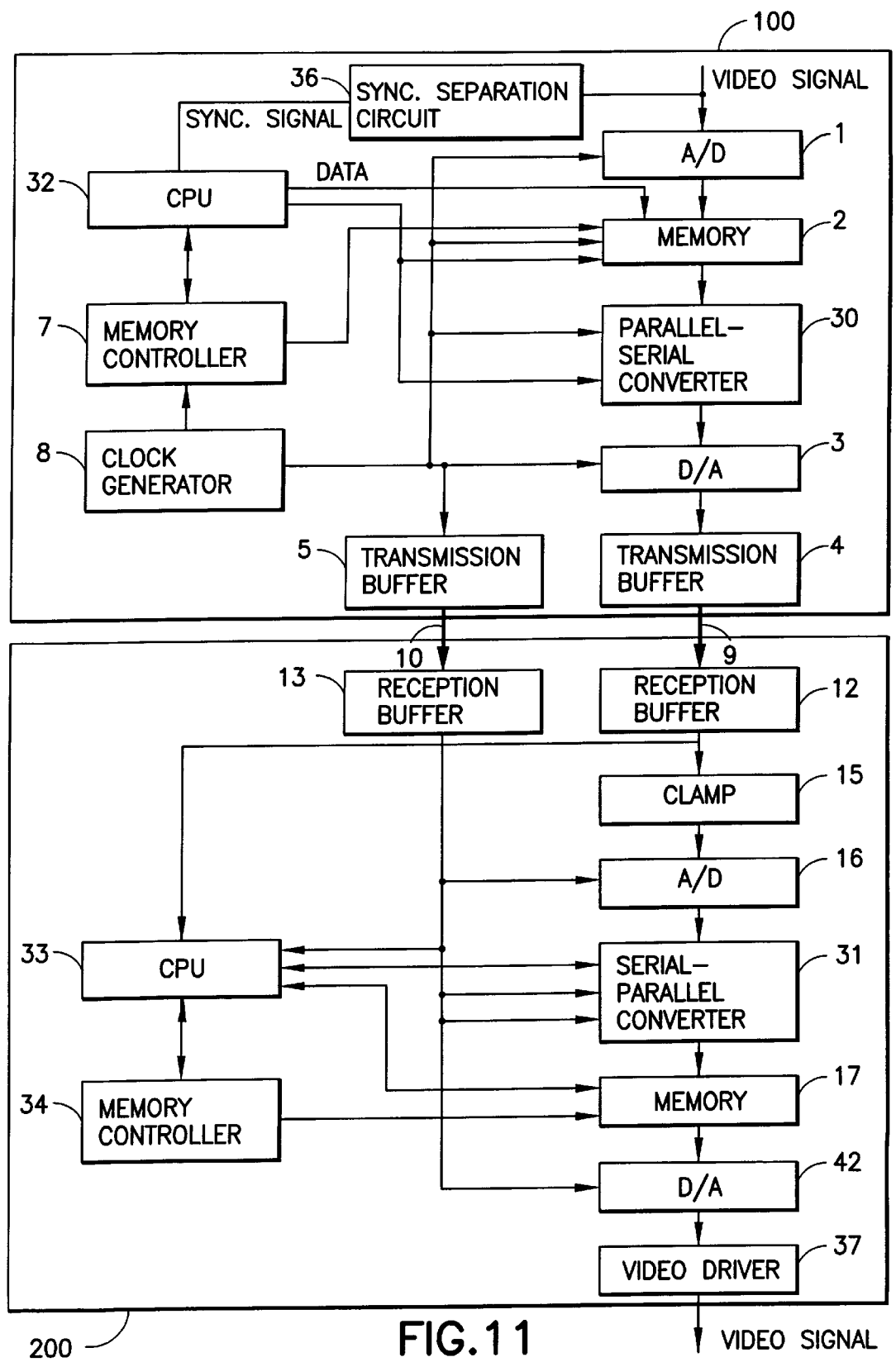
FIG. 11 is a block diagram showing the arrangement of a data communication system according to the third embodiment of the present invention.

FIG. 11 is a block diagram showing the arrangement of a data communication system according to the third embodiment of the present invention. Referring to FIG. 11, the system comprises a transmission apparatus 100 and a receiving apparatus 200. An A/D converter 1 converts a video signal input from an image input device such as a camera into digital data. A memory 2 temporarily stores digital data. A D/A converter 3 converts digital data into an analog signal. Transmission buffers 4 and 5 perform impedance matching of communication lines 9 and 10 upon transmitting data.

A memory controller 7 controls data read/write accesses to the memory 2. A clock generator 8 generates clocks to be supplied to the A/D converter 1, the D/A converter 3, and the memory 2. The communication lines 9 and 10 are respectively used for transmitting data and clocks.

Reception buffers 12 and 13 perform impedance matching of the communication lines 9 and 10 for receiving data and clocks. A clamp circuit 15 converts a signal to a level suitable for an A/D converter 16 at its output side, and the A/D converter 16 converts the received analog signal into digital data. A memory 17 temporarily stores the converted digital data.

A P/S converter 30 P/S-converts the digital data from the memory 2, and an S/P converter 31 S/P-converts the digital data from the A/D converter 16.

A CPU 32 controls the memory controller 7 and the P/S converter 30, and outputs data to the memory 2. A CPU 33 on the receiving side controls the S/P converter 31 and a memory controller 34. The CPU 33 can read/write data to/from the memory 17. The memory controller 34 controls the read/write accesses to the memory 17. A sync. separation circuit 36 separates a sync. signal from the input video signal.

The operation of the data communication system with the above arrangement will be explained below. A video signal input to the A/D converter 1 is converted into digital data in accordance with clocks generated by the clock generator 8. The converted digital data is input to the memory 2 and is temporarily stored therein.

Note that digital data can be directly input to the memory 2 by an external device. In this embodiment, the CPU 32 writes digital data in the memory 2.

The memory controller 7 controls the read/write accesses to the memory 2 in accordance with a user's request. Digital data output from the memory 2, controlled by the memory controller 7, is P/S-converted as needed. At this time, the CPU 32 can select whether data is supplied to the D/A converter 3 as parallel or serial data.

Upon outputting a video signal via the communication line 9, the P/S converter 30 outputs parallel data to the D/A converter 3 without S/P-converting it in accordance with a command from the CPU 32. The D/A converter 3 converts, e.g., 8-bit digital data into an analog signal on the basis of the clocks generated by the clock generator 8, and transfers it as a video signal to the transmission buffer 4.

The transmission buffer 4 transmits the received video signal to the reception buffer 12 via the communication line 9 which is terminated at 75 Ω. The reception buffer 12 is also terminated at 75 Ω, and outputs the received video signal to the subsequent clamp circuit 15. The clamp circuit 15 converts the video signal into a level suitable for the A/D converter 16, and outputs the converted signal thereto.

The A/D converter 16 converts the input video signal into digital data on the basis of the clocks sent from the reception buffer 13, and outputs the digital data to the S/P converter 31. The S/P converter 31 does not perform S/P conversion in accordance with a request from the CPU 33, and stores the data in the memory 17 controlled by the memory controller 34.

On the other hand, when the P/S converter 30 P/S-converts digital data, parallel data read out from the memory 2 is P/S-converted, and serial data is output to the D/A converter 3 under control by the CPU 32.

The D/A converter 3 D/A-converts the received serial data, and outputs the video signal input to the A/D converter 1 or data directly written in the memory 2 by the CPU 32, an external computer, or the like to the transmission buffer 4.

The transmission buffer 4 transmits the received video signal to the reception buffer 12 via the communication line 9 terminated at 75 Ω. The reception buffer 12 is also terminated at 75 Ω, and outputs the received video signal to the next clamp circuit 15. The clamp circuit 15 converts the input signal to a level suitable for the subsequent A/D converter 16, and outputs the converted signal to the A/D converter 16.

The A/D converter 16 converts the input signal into digital data, and outputs the digital data to the S/P converter 31. The S/P converter performs S/P conversion in accordance with a request from the CPU 33, and stores the converted parallel data in the memory 17 controlled by the memory controller 34.

At this time, a sync. signal separated from the video signal by the sync. separation circuit 36 is output to the CPU 32 and the clock generator 8. Upon receiving the sync. signal, the clock generator 8 generates clocks on the basis of the sync. signal, and the generated clocks are used in A/D and D/A conversions of the A/D and D/A converters 1 and 3. In this embodiment, the sync. signal is separated before the A/D converter 1. Alternatively, after a video signal is converted into digital data by the A/D converter 1, the sync. signal may be separated from the digital video data.

Figure 12:
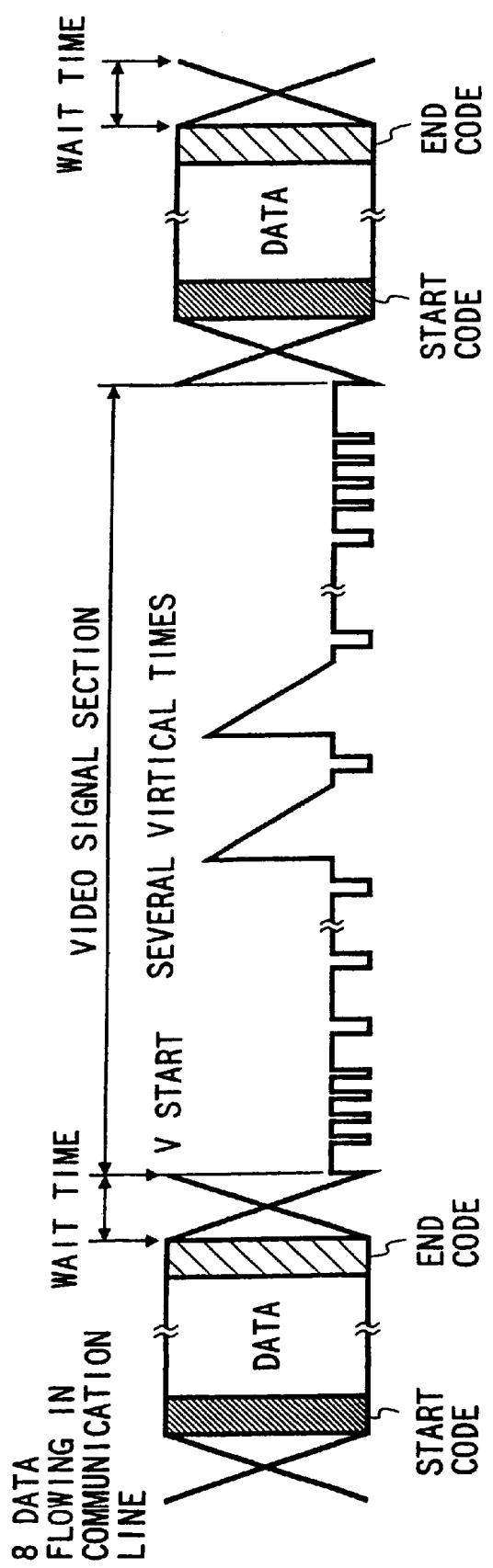
FIG. 12 is a timing chart showing the signal flowing in a communication line upon parallel-serial conversion in the arrangement shown in FIG. 11.

The sync. signal supplied to the CPU 32 is used for controlling the P/S conversion timing of the P/S converter 30. FIG. 12 is a timing chart showing the signal flowing in the communication line 9 upon P/S conversion.

The CPU 33 monitors data that flows in the communication line 9. Upon detecting arbitrary data flowing in the line 9, the CPU 33 inhibits S/P conversion of the S/P converter 31, and directly writes the digital data received from the A/D converter 16 in the memory 17.

At this time, the memory controller 34 controls the memory 17 to write serial data. Upon transition from the parallel data transmission state to the serial data transmission state, the CPU 33 controls the S/P converter 31 to perform S/P conversion upon detecting arbitrary data. With this control, parallel data is written in the memory 17.

Upon receiving a video signal as parallel data, in other words, when parallel data is received, and data communications are performed at the video rate without operating the S/P converter 31, the memory 17 outputs the temporarily stored data to a D/A converter 42, which performs D/A conversion in accordance with the clocks received from the reception buffer 13. The converted analog signal is output to a video driver 37 as a video signal, and the video driver 37 outputs the video signal to an external device such as a monitor.

Serial data flowing in the communication line 9 is received by the reception buffer 12, and is output to the clamp circuit 15 and the CPU 33. The clamp circuit 15 converts the serial data to a level suitable for the A/D converter 16. The converted serial data is input to the A/D converter 16, and is A/D-converted. The converted digital data is then input to the S/P converter 31.

Upon detecting arbitrary input data, the CPU 33 operates the S/P converter 31 to convert the serial data into parallel data. The converted parallel data is written in the memory 17. In this case, the written data is subjected to read/write accesses by communicating with the CPU 33. Data read out by the CPU 33 is output to an external device such as an external computer. Conversely, the external device such as an external computer can write data in the memory 17 via the CPU 33.

Figure 13:
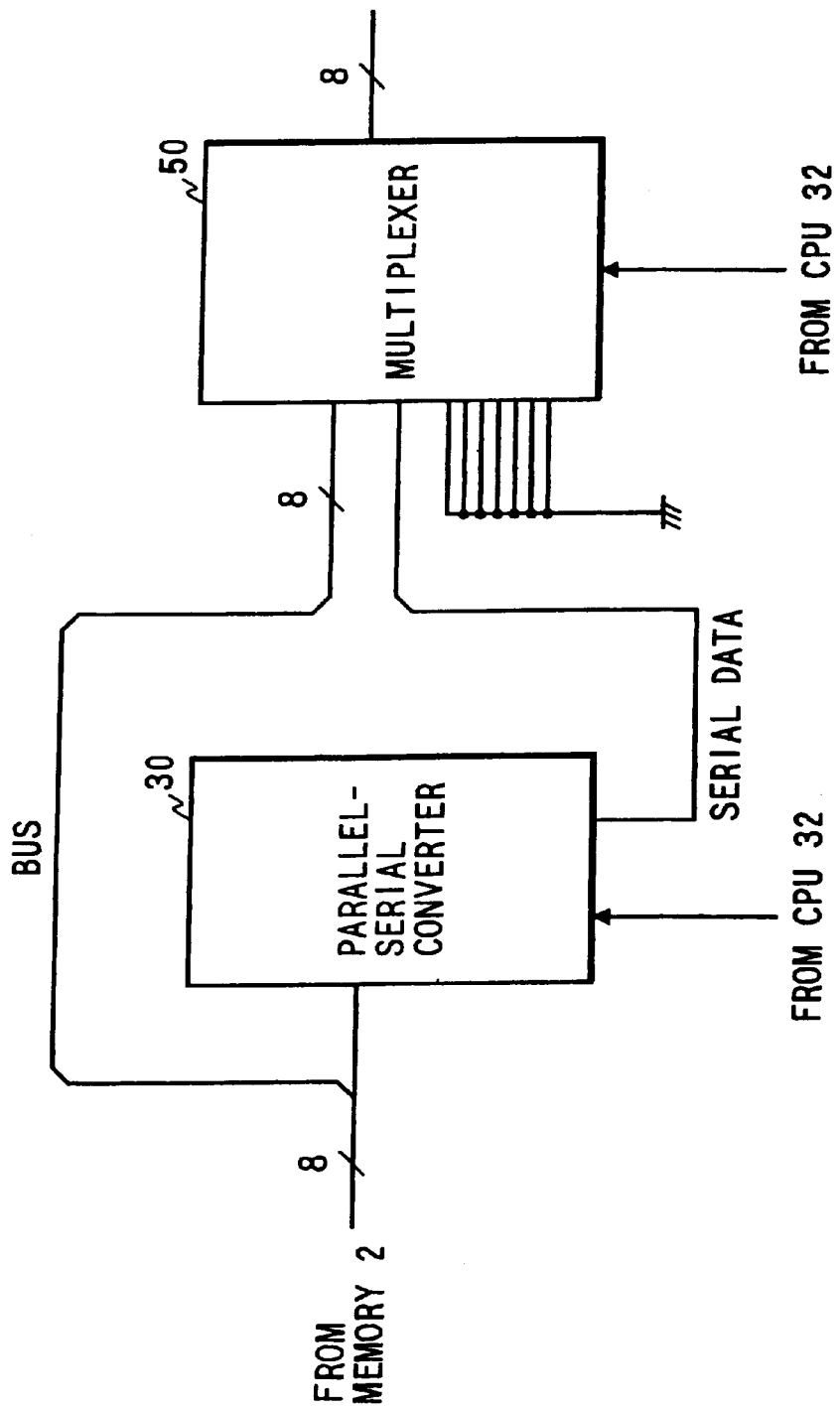
FIG. 13 is a block diagram showing the arrangement of a parallel-serial converter shown in FIG. 11.

FIG. 13 is a block diagram showing the arrangement of the P/S converter. Referring to FIG. 13, a multiplexer 50 switches data. 8-bit parallel data input from the memory 2 is input to a P/S converter 30 and the multiplexer 50. The parallel data input to the P/S converter 30 is converted into serial data. The converted serial data is assigned to one arbitrary bit of one of two 8-bit terminals of the multiplexer 50.

The bit to be assigned this data is preferably the most significant bit (MSB). The non-assigned bits are connected to ground and are at L level. Note that the non-assigned bits may be set at H level in place of L level.

Figure 14:
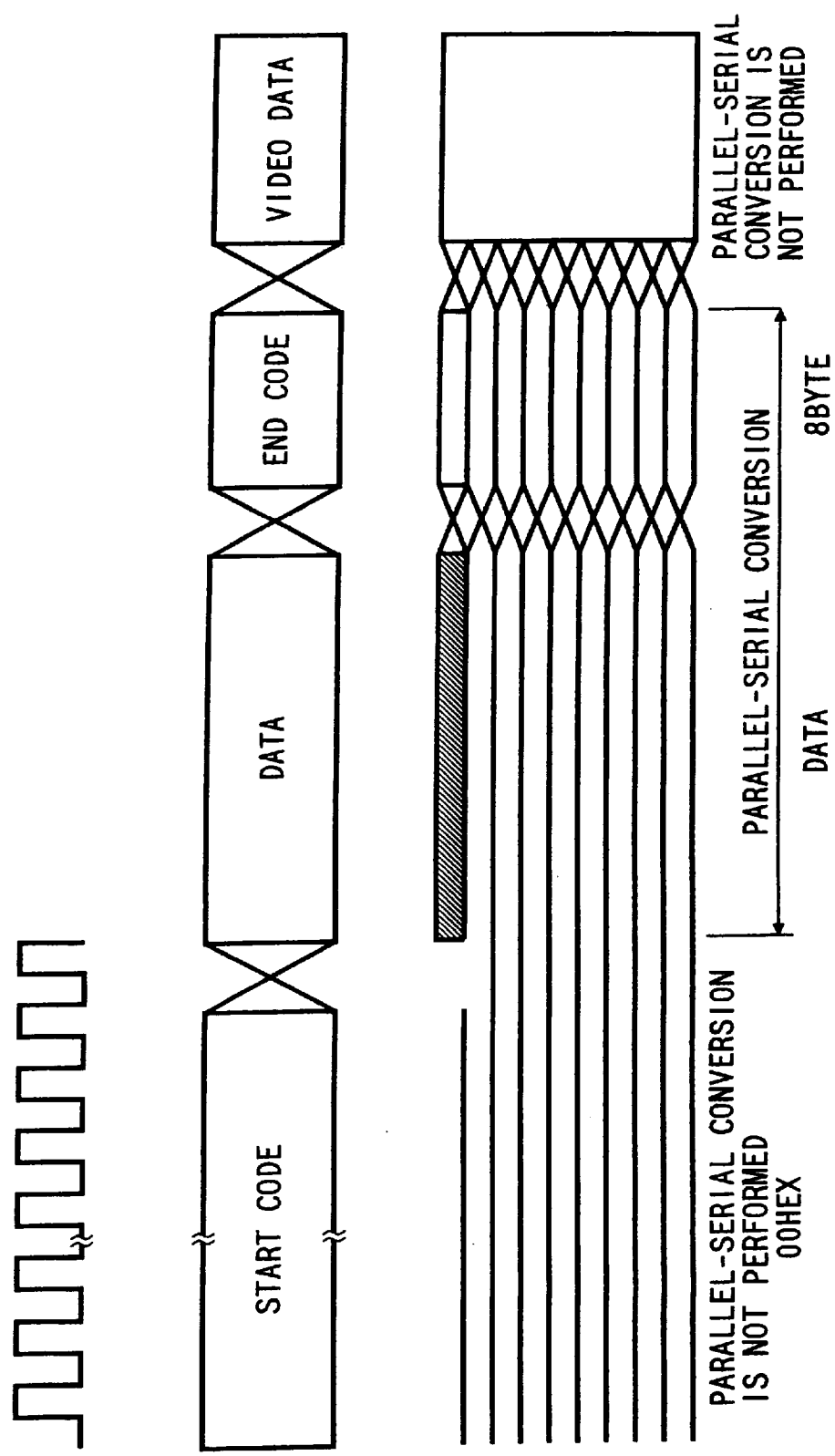
FIG. 14 is a timing chart showing the output data in the arrangement shown in FIG. 11.

Parallel data coming from the memory 2 is input as 8-bit data to the multiplexer 50. The multiplexer 50 selects whether to output parallel or serial data under the control of the CPU 32. FIG. 14 is a timing chart showing the output data. For example, if the MSB of data read out from the memory 2 is L level, a start code is expressed as a code representing that a video signal is switched to digital data. At this time, the MSB keeps outputting an L-level code for one vertical period so as to prevent detection errors of the start code at the receiving side.

Figure 15:
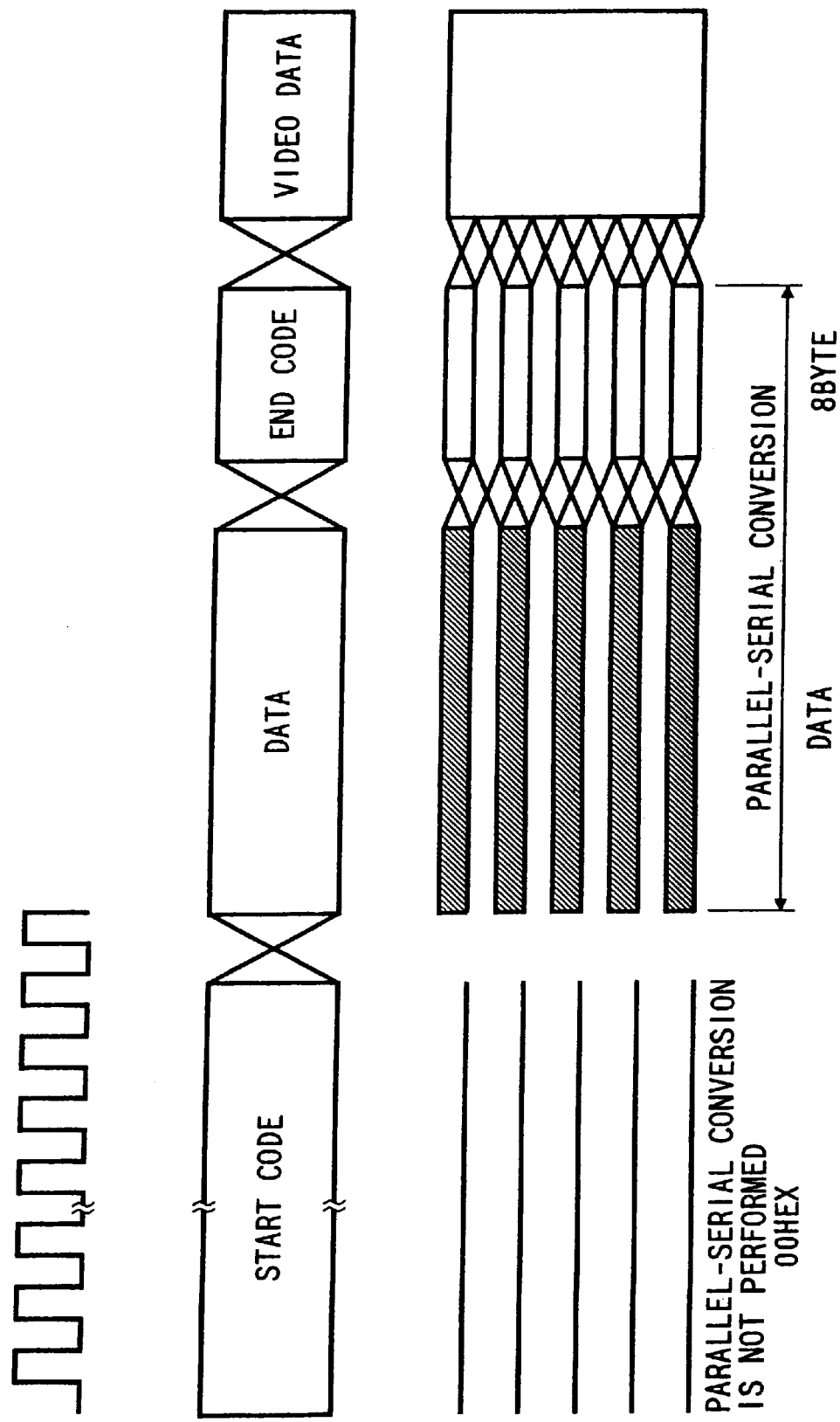
FIG. 15 is a timing chart of parallel-serial conversion in the arrangement shown in FIG. 11.
Figure 16:
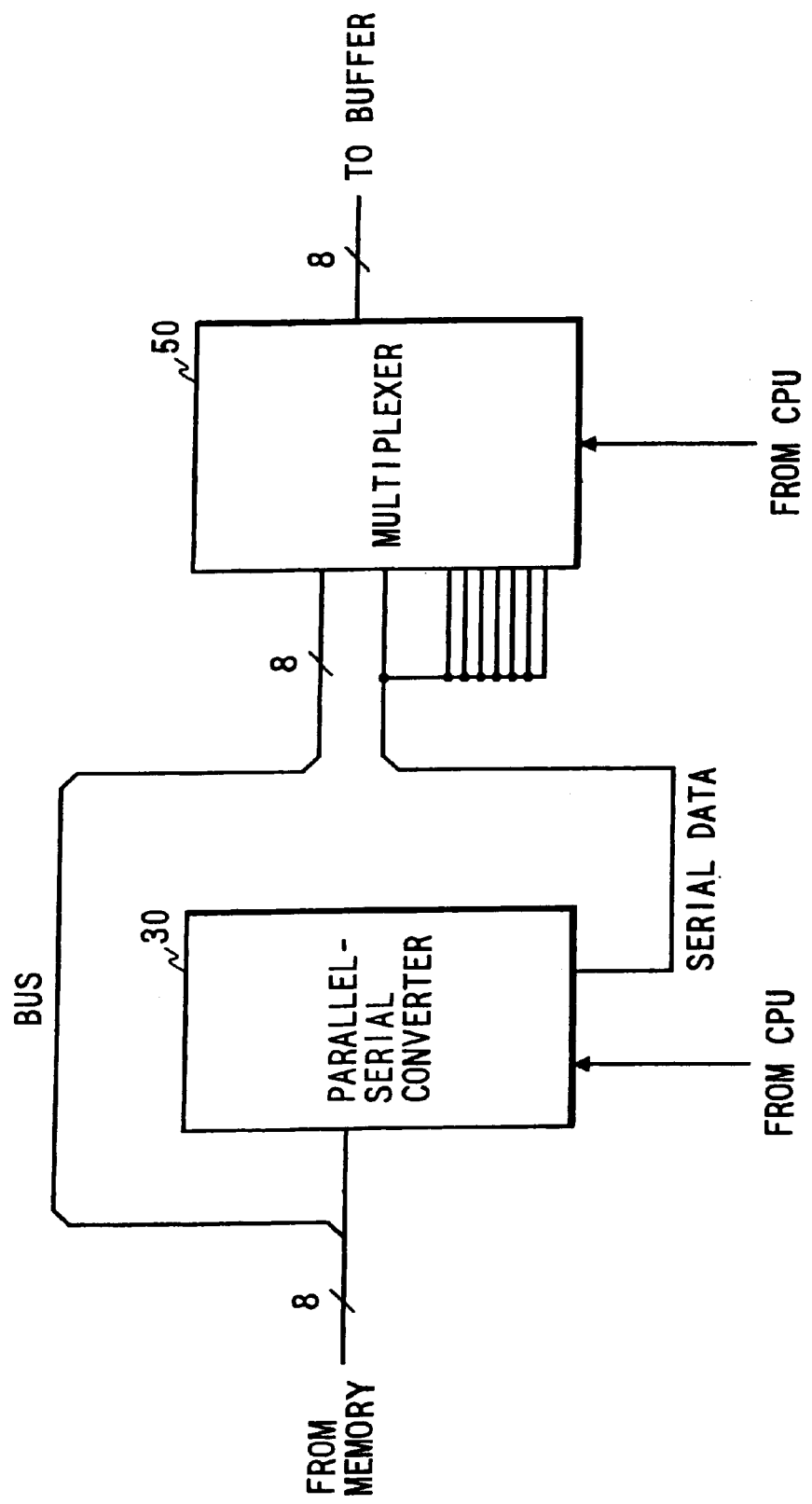
FIG. 16 is a block diagram showing another arrangement of the parallel-serial converter shown in FIG. 11.

FIG. 15 is a timing chart showing P/S conversion. FIG. 16 is a block diagram showing another arrangement of the P/S converter. Referring to FIG. 16, a multiplexer 50 switches data. 8-bit parallel data input from the memory 2 is input to a P/S converter 30 and the multiplexer 50. The parallel data input to the P/S converter 30 is converted into serial data. The converted serial data is assigned to all the bits of one of two 8-bit terminals of the multiplexer 50. Parallel data coming from the memory 2 is input as 8-bit data to the multiplexer 50. The multiplexer 50 selects whether to output parallel or serial data under the control of the CPU 32. For example, if all the bits of data read out from the memory 2 are L level, a start code is expressed as a code representing that a video signal is switched to digital data. At this time, the MSB keeps outputting an L- or H-level code for one horizontal period so as to prevent detection errors of the start code at the receiving side.

According to the data communication system according to the present invention, a video signal, control data, and the like can communicate using a signal communication line, and high-speed transmission of control data can be realized using a communication line for a video signal. Hence, the number of communication lines can be reduced, and the transmission and reception buffers need not be expanded, thus realizing a size reduction of the system.

Also, execution of S/P conversion and P/S conversion can be controlled using the start and end codes.

An image displayed based on a video signal can be prevented from being disturbed even during transmission of control data.

Furthermore, a video signal, control data, and the like can communicate using a single communication line.

Another embodiment of an image processing apparatus of the present invention will be described hereinafter. The image processing apparatus of this embodiment constitutes an image processing system together with an image input apparatus to be described later. The image input apparatus and the image processing apparatus are connected to each other via a video signal line and a control line. Such image processing system is applied to a camera head separate type camera which comprises a camera head as an image input apparatus and a camera main body as an image processing apparatus.

Figure 17:
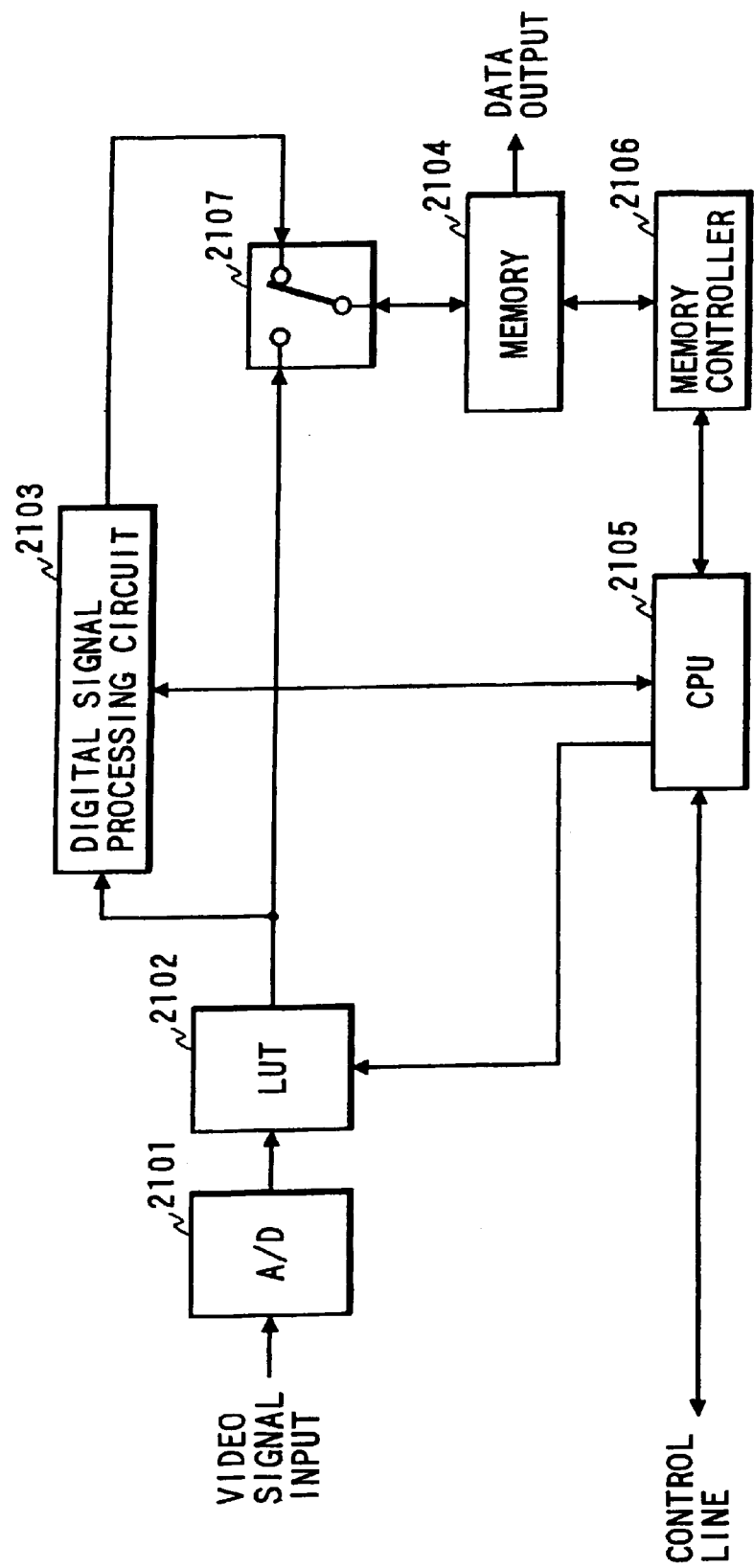
FIG. 17 is a block diagram showing the arrangement of an image processing apparatus according to another embodiment of the present invention.

FIG. 17 is a block diagram showing the arrangement of the image processing apparatus. Referring to FIG. 17, the image processing apparatus comprises an A/D conversion circuit 2101, a look-up table (LUT) 2102, a digital signal processing circuit 2103, a memory 2104, a CPU 2105, a memory controller 2106, and a switch 2107.

Figure 18:
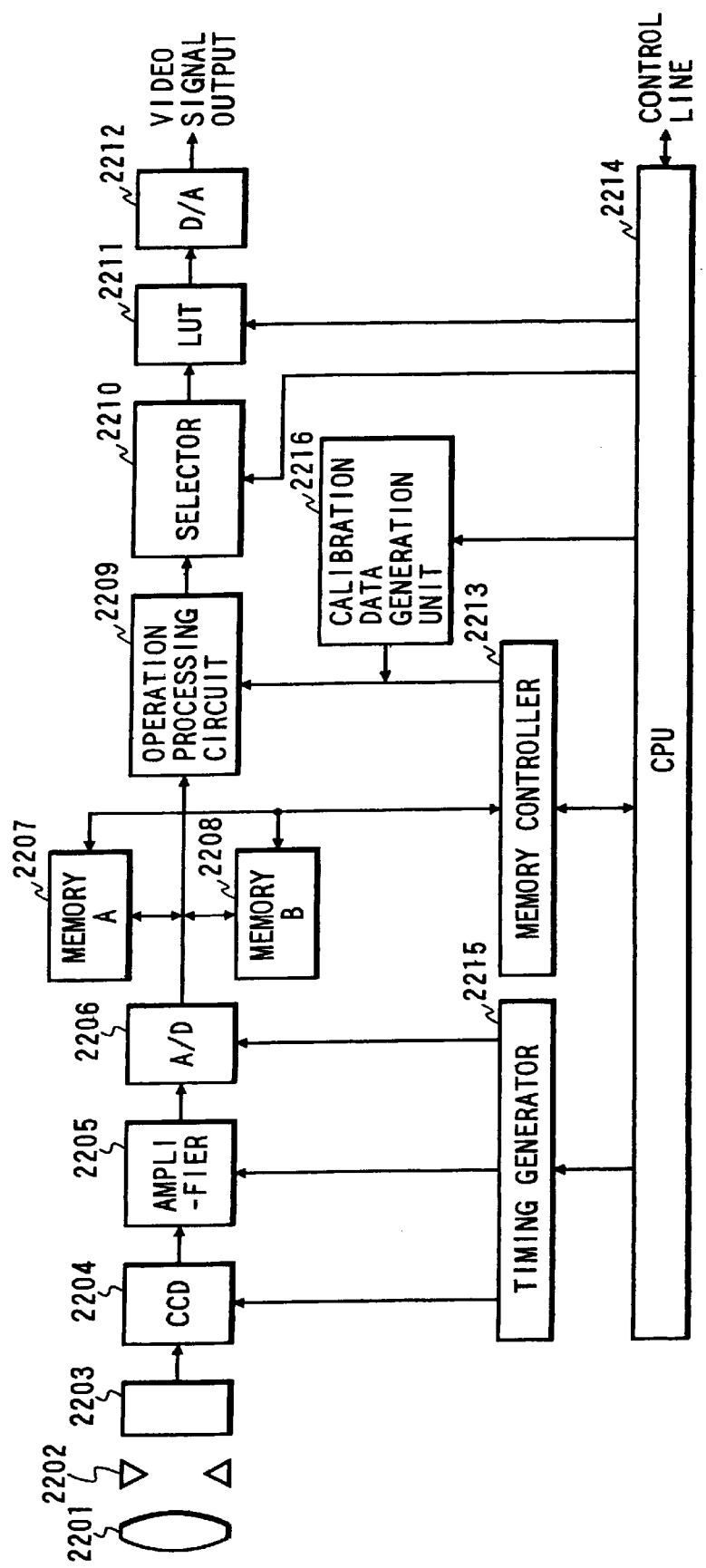
FIG. 18 is a block diagram showing the arrangement of an image input apparatus according to still another embodiment of the present invention.

FIG. 18 is a block diagram showing the arrangement of the image input apparatus. Referring to FIG. 18, the image input apparatus comprises a lens 2201, an aperture portion 2202, an optical low-pass filter 2203 with a complementary color mosaic pattern, a CCD 2204, a gain amplifier 2205, and an A/D conversion circuit 2206.

Also, the image input apparatus comprises a memory A 2207, a memory B 2208, an operation processing circuit 2209, a selector 2210, a look-up table (LUT) 2211, a D/A conversion circuit 2212, a memory controller 2213, a CPU 2214, a timing generator 2215, and a calibration data generation unit 2216.

Figure 19:
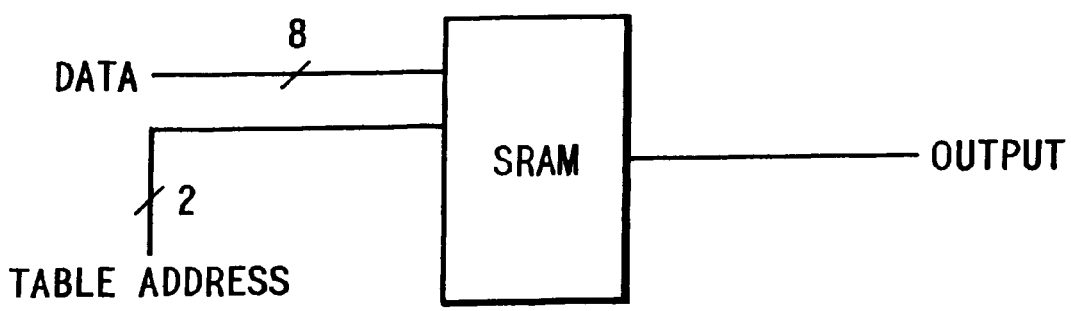
FIG. 19 is a block diagram showing a static RAM in which a look-up table shown in FIG. 17 is written.

The LUT 2102 of the image processing apparatus will be described in detail below. FIG. 19 is a block diagram showing a static RAM in which the LUT 2102 is written. The LUT 2102 determines the arrangement of output data by table data transferred from the CPU 2105. By writing data in the LUT 2102 in the static RAM, required table conversion is attained.

Figure 20:
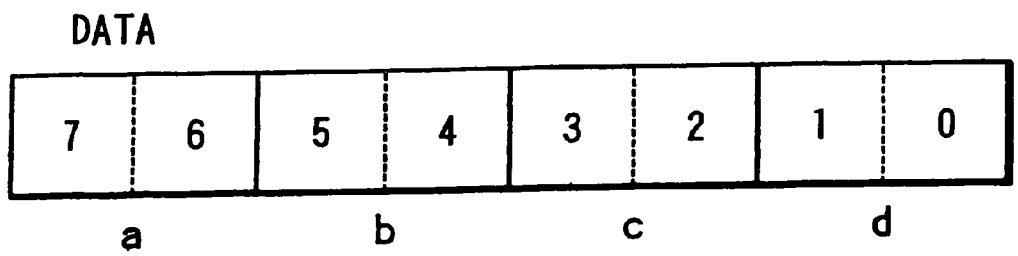
FIG. 20 is an explanatory view showing a case wherein data is divided into 2-bit groups a, b, c, and d.

The LUT 2102 selects one of four tables based on a table switching signal that uses upper 2 bits of a 10-bit input and is supplied from the CPU 2105, and converts 8-bit input data. In this embodiment, 8 bits of the input data are divided in units of 2 bits, and 2-bit data are transferred four times, thus transmitting data to a receiver. FIG. 20 is an explanatory view showing the case wherein data is divided into 2-bit groups a, b, c, and d.

Since each 2-bit data assumes one of four values "00", "01", "10", and "11", such data need only be reproduced by the digital signal processing circuit 2103 via the video signal line. When a video signal is input to the A/D conversion circuit 2101 having a resolution of 8 bits, the four values are assigned values within the range from 0 to 255. For example, the values "00", "01", "10", and "11" are respectively assigned the values of four different levels, i.e., "0", "85", "170", and "255" within the range from 0 to 255.

As for group a in FIG. 20, "0" is assigned to the range in which upper 2 bits of 8 bits assume the value "00", i.e., the range from 00000000 to 00111111 in binary notation (the range from 0 to 63 in decimal notation). The value to be assumed next is set to be "85" as a value obtained by dividing "255" by four. This value is assigned to the range of values assumed by 8-bit data when the upper 2 bits are "01", i.e., the range from 01000000 to 01111111 in binary notation (i.e., the range of data from 64 to 127).

Figure 21:
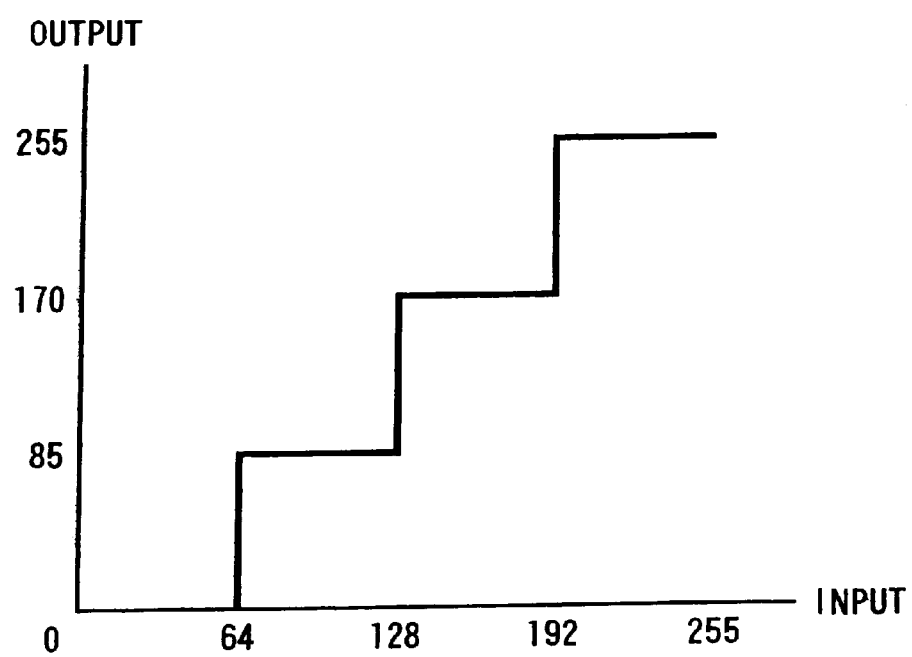
FIG. 21 is a graph showing the conversion table.

The next value "170" is assigned to the range of values when the upper 2 bits are "10", i.e., the range from 10000000 to 10111111 in binary notation (i.e., the range from 128 to 191 in decimal notation). Similarly, the value "255" is assigned to the range in which upper 2 bits assume "11", i.e., the range from 11000000 to 11111111 in binary notation (i.e., the range from 192 to 255 in decimal notation). FIG. 21 is a graph showing the table data which are assigned as described above. FIG. 21 is a graph showing the conversion table.

Figure 22:
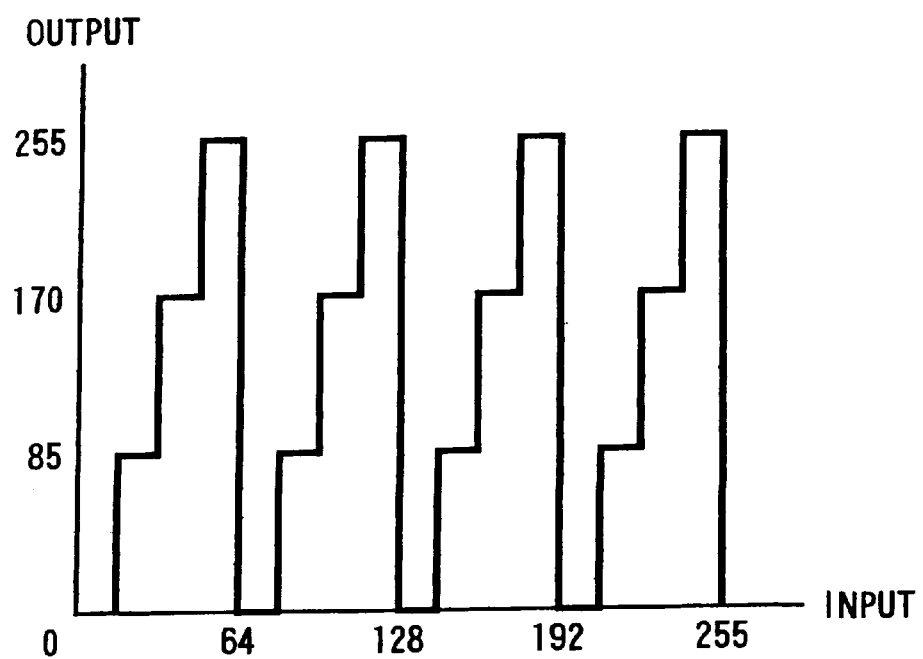
FIG. 22 is a graph showing the conversion table.

In the next two bits, i.e., in group b shown in FIG. 20, the range in which the two bits of the lower 6 bits assume the value "00" corresponds to the range from 000000 to 001111 in binary notation (i.e., the range from 0 to 15), and "0" is assigned to this range. The value "85" is assigned to the range in which the 2 bits assume "01", i.e., the range from 010000 to 011111 in binary notation (i.e., the range from 16 to 31). The value "170" is assigned to the range in which the 2 bits assume "10", i.e., the range from 100000 to 101111 in binary notation (i.e., the range from 32 to 47). Finally, the value "255" is assigned to the range in which the 2 bits assume "11", i.e., the range from 110000 to 111111 in binary notation (i.e., the range from 48 to 63). When a table is formed based on these values combining those of upper 2 bits, the conversion table shown in the graph of FIG. 22 is obtained. Likewise, a conversion table is formed for the lower 4 bits.

In the image processing apparatus with the LUT 2102, an input video signal is converted by the A/D conversion circuit 2101 from an analog signal into a digital signal. The digital input signal is input to the LUT 2102, and data are converted based on the table data into data, the 2 bits of interest of which are converted into one of values "00", "01", "10", and "11", depending on one of the four value levels determined at the output side to which the input data corresponds to.

For example, in the case of upper 2-bit data transmission, it is confirmed via the communication line that upper 2 bits of 8-bit data are sent first. After the input signal is converted into a digital value by the A/D conversion circuit 2101, the digital value is set to be table data in which the upper 2 bits assume one of "00", "01", "10", and "11", and the lower 6 bits are "0"s depending on its value "0", "85", "170", and "255".

Figure 23:
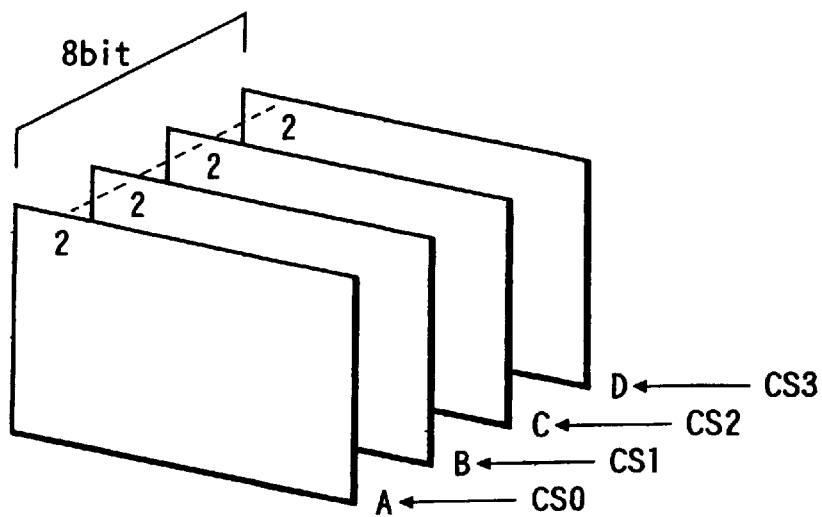
FIG. 23 is an explanatory view showing the arrangement of a memory shown in FIG. 17.

On the other hand, the memory 2104 that stores table-converted data comprises four multi-port DRAMs. FIG. 23 is an explanatory view showing the arrangement of the memory 2104. Memories A, B, C, and D comprising four DRAMs are selected in turn by enable signals CS0, CS1, CS2, and CS3, and 2 bits of 8-bit data are written in each of the memories A, B, C, and D via the switch 2107 switched to the LUT 2102 side.

Figure 24:
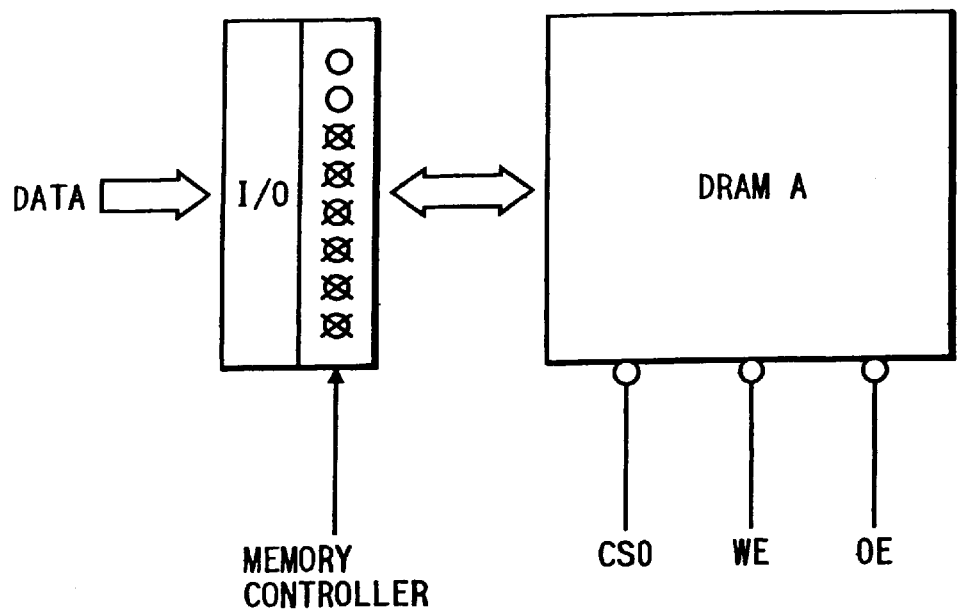
FIG. 24 is an explanatory view showing the write operation of upper 2-bit data.

The write operation of the first upper 2-bit data will be explained below. FIG. 24 is an explanatory view showing the write operation of upper 2-bit data. Data is input via an I/O port, as indicated by an arrow in FIG. 24. At this time, the I/O port is set in advance in a write mask mode by the memory controller, and bits other than the bits of interest are masked. In this case, bits other than upper 2 bits are masked, and data is written in the DRAM by inputting the enable signal CS0 corresponding to the memory A in which data is to be written, and a write signal WE.

In this manner, 8-bit data is vertically written in the four memories A, B, C, and D of the memory 2104 as bit planes in units of 2 bits in the order from the MSB by switching the enable signals CS0 to CS3.

Upon reading out data from the memories A, B, C, and D, 2 bits each are read out as 8-bit data from these memories in the order from the MSB, thus reconstructing data.

In this manner, in the image processing apparatus of this embodiment, 8-bit data is transferred while being divided in units of 2 bits. Alternatively, the number of divided bits may be reduced, and data may be transferred in units of bits. On the other hand, this embodiment is not limited to 8-bit data, but may be applied to data transfer of data consisting of an arbitrary number of bits.

The operation of the image input apparatus side will be described below. When the data of a video signal is to be transferred from the image input apparatus side via the video signal line, the image processing apparatus sends a calibration data transfer instruction. Upon reception of the instruction, the CPU 2214 in the image input apparatus side instructs the calibration data generation unit 2216 to start generation of calibration data.

The calibration data is table-converted into 2-bit data as in the image processing apparatus side. These 2-bit data are D/A-converted by the D/A conversion circuit 2212, and the analog signal is supplied to the A/D conversion circuit 2101 via the video signal line. The analog signal is re-converted into a digital signal by the A/D conversion circuit 2101, and the digital signal is stored in the memory 2104.

Figure 25:
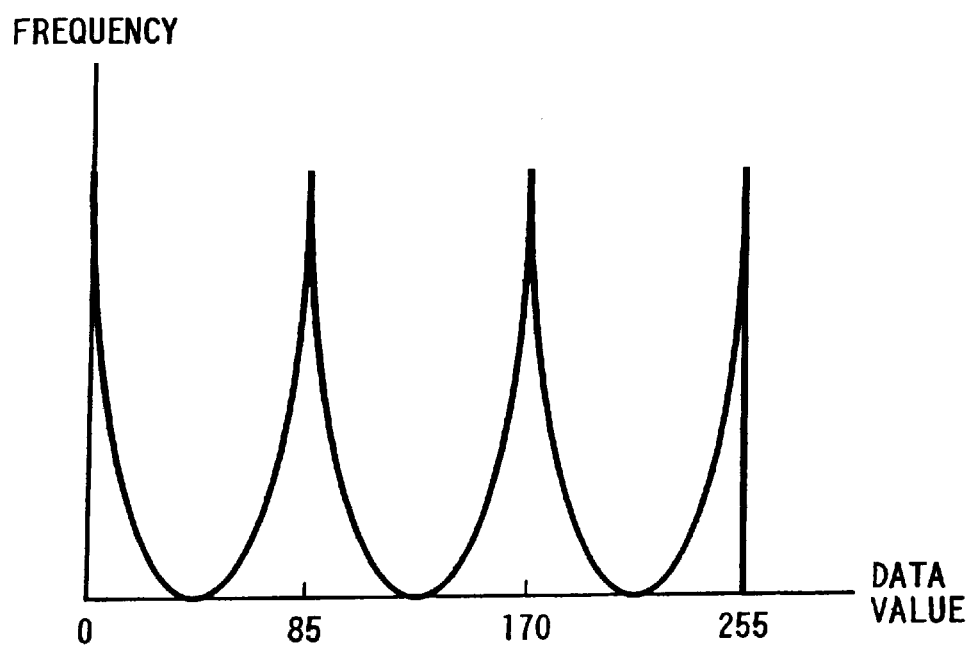
FIG. 25 is a graph showing the distribution of values after D/A conversion of data transmitted by the arrangement shown in FIG. 18.

At this time, data before transmission and the received data after D/A conversion may have a difference due to conversion into an analog signal in the D/A conversion circuit 2212 and deterioration of the video signal depending on the state of the transmission path. FIG. 25 is a graph showing the distribution of values after D/A conversion of transmitted data. As shown in FIG. 25, the D/A-converted data is distributed over a certain range around the actually transmitted data and is sent to the receiving side to have certain variations. Since this data must be converted into original 2-bit data to be stored in the memory, the LUT 2102 on the receiving side must be designed to convert input data having variations within a certain allowable error range into original 2-bit data.

Figure 26:
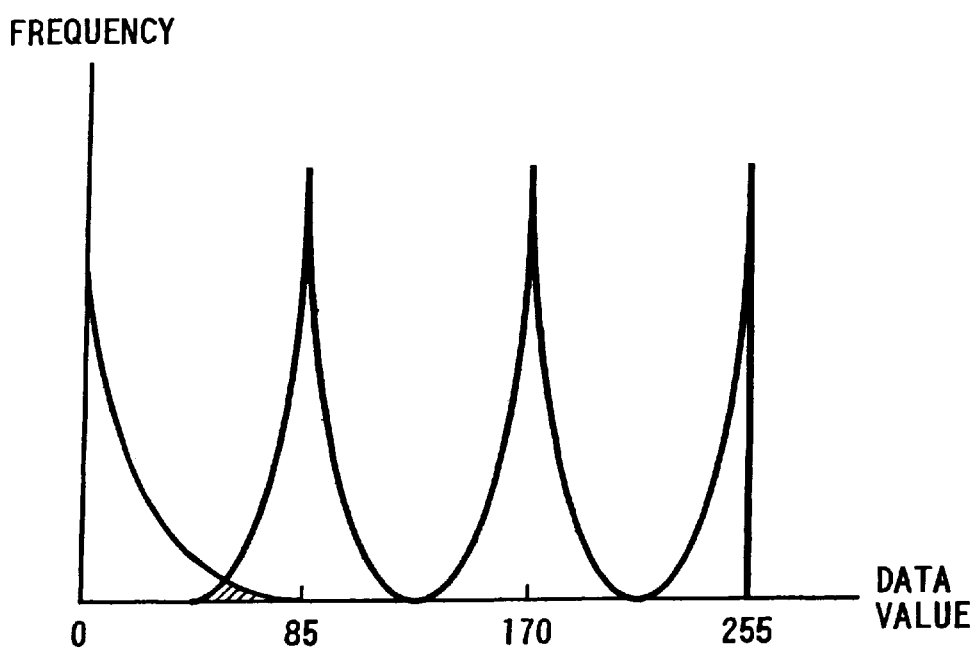
FIG. 26 is a graph showing the offset data distribution.

However, even when the LUT 2102 is designed to be able to absorb such error range, D/A-converted data cannot often be clearly assigned one of the values "0", "85", "170", and "255" (the hatched portion in FIG. 26) due to the reception state in which the data distribution deviates from an expected value or too large error variations, as shown in FIG. 26.

In order to detect occurrence of such state, the received calibration data is re-converted into a digital signal by the A/D conversion circuit 2102, and the digital signal is directly supplied to the digital signal processing circuit 2103 without being table-converted by the LUT 2102. Then, a state of quality of data transmission is discriminated by using the some received calibration data. For this purpose, by calculating an average value m of transmission data of "0", "85", "170", and "255", the transmission/reception state can be discriminated.

Since the average value m should be equal to or close to a corresponding one of "0", "85", "170", and "255", the accuracy of transfer data can be determined by this comparison. Also, the digital signal processing circuit 2103 calculates the variance to examine the degree of variations of data.

The data transfer quality is measured based on the average value and variance. When the case shown in FIG. 26 is detected, i.e, when it is determined that the data distribution is offset, the value of the LUT on the data transmission side is changed to assure accurate data transfer that allows to accurately reconstruct original data after A/D conversion. More specifically, when it is determined based on the calculation results of the average value and variance of the calibration data that the table-converted value "85" assumes a value that cannot be separated from the value "0", the CPU 2105 transmits a change value of table data via the control line.

Figure 27:
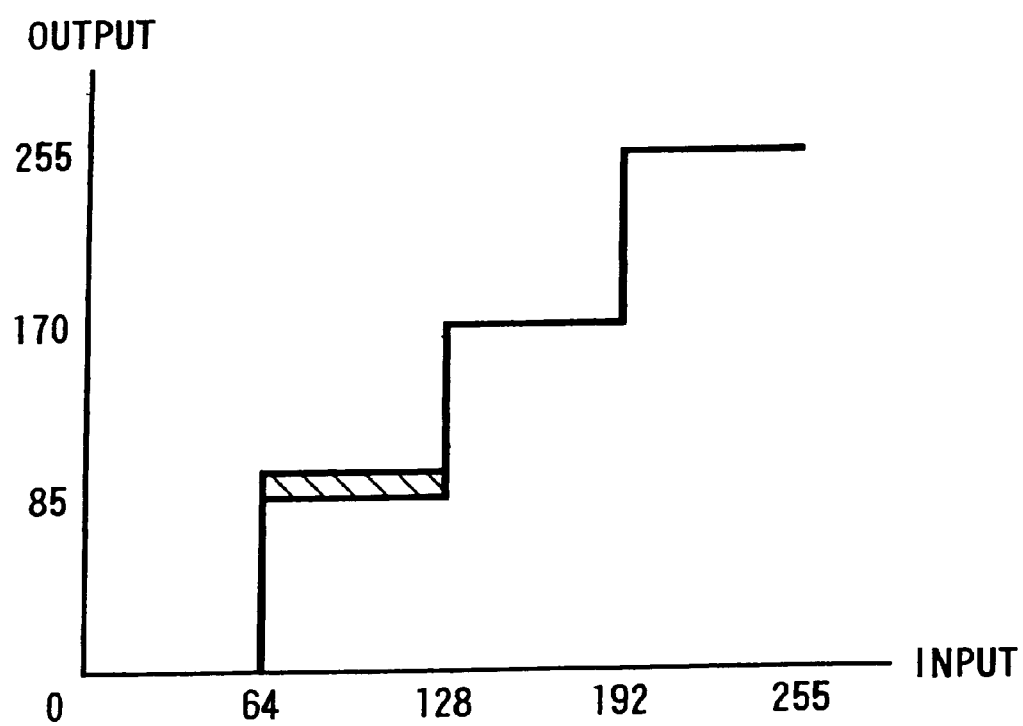
FIG. 27 is a graph showing the conversion data of a look-up table shown in FIG. 18.

In the image input apparatus, the CPU 2214 receives the table data change value, and changes the converted data "85" of 2-bit data "01" in the LUT 2211 to be the table data change value, as shown in FIG. 27. In this case, the value is changed upward, as indicated by hatching in FIG. 27. With this operation, when data transmitted to the image processing apparatus side is converted into a digital signal again, the distribution of data variations includes four values, as shown in FIG. 25, and the data can be transmitted as one that can be table-converted into an original 2-bit signal again.

When calibration data cannot be accurately transmitted since the table data is changed, the CPU 2105 in the image processing apparatus re-transmits the table data change value to the image input apparatus side using the control line. However, when accurate data transfer cannot be made even when the CPU 2105 of the image processing apparatus side repetitively changes the table data several times, the CPU 2105 transmits a request for changing the number of divided bits to be transferred to the image input apparatus side via the control line.

The image input apparatus instructs the calibration data generation unit 2216 to switch the 2-bit divisional transmission mode to the 1-bit divisional transmission mode. Upon reception of this instruction, the calibration data generation unit 2216 starts data transfer in units of bits. The data in units of bits are converted into an analog signal by the D/A conversion circuit 2212, and the analog signal is transmitted from the video signal line. The image processing apparatus on the receiving side performs processing in units of bits as in the 2-bit transmission mode.

In this manner, according to the image processing apparatus of this embodiment, when data is divided and the divided data are transmitted via the video signal line, the data can be transferred without impairing the data quality. In addition, data can be transferred at a higher transfer rate than that using the control line. Furthermore, by measuring the data transfer quality, the LUT is calibrated based on the measurement result, thus allowing data transfer more accurately.

This embodiment has exemplified a case wherein the data reception state is poor. However, the present invention is not limited to such case, and the number of divided bit groups may be decreased to increase the transfer rate.

Figure 1:
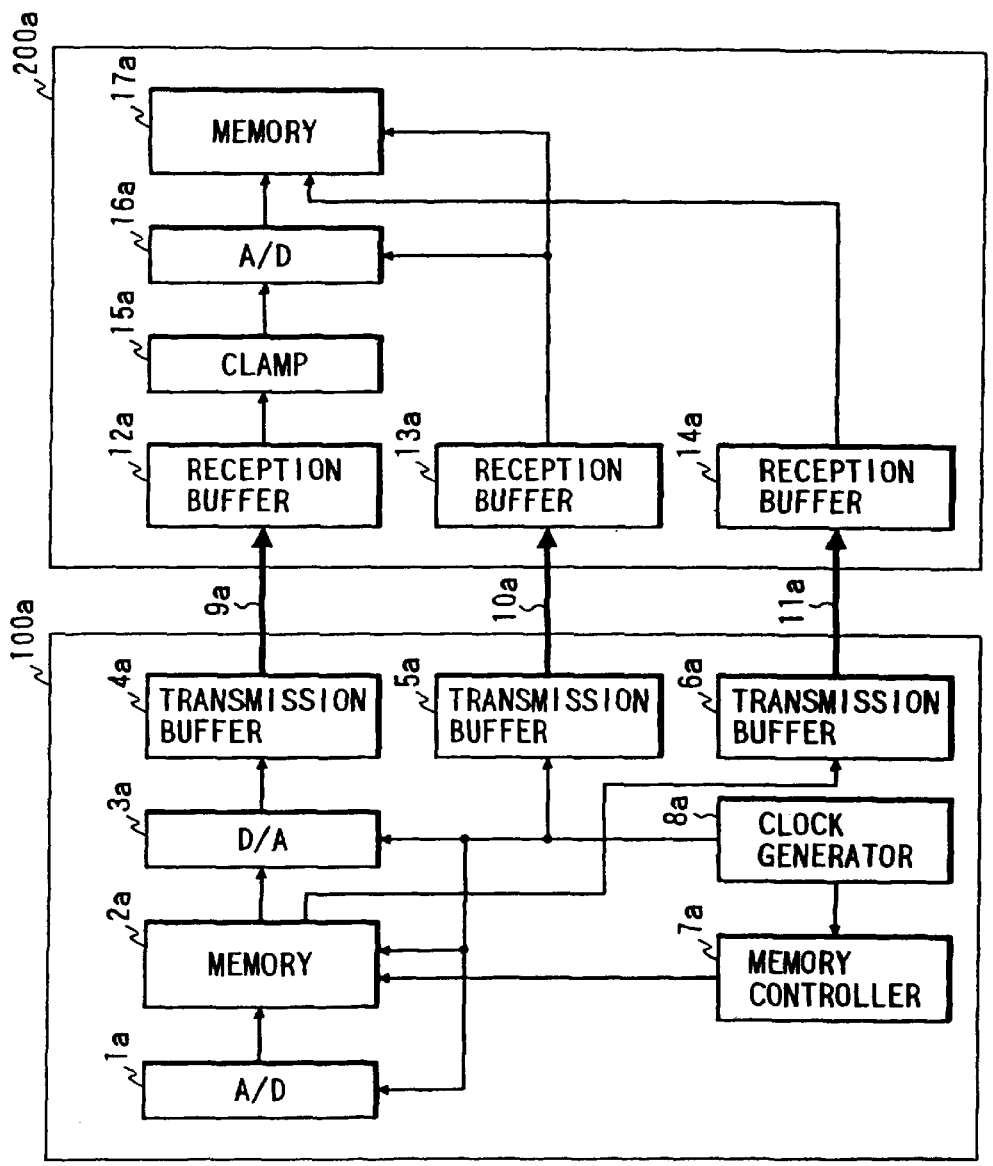
FIG. 1 is a block diagram showing the arrangement of a conventional data communication system.
Figure 2:
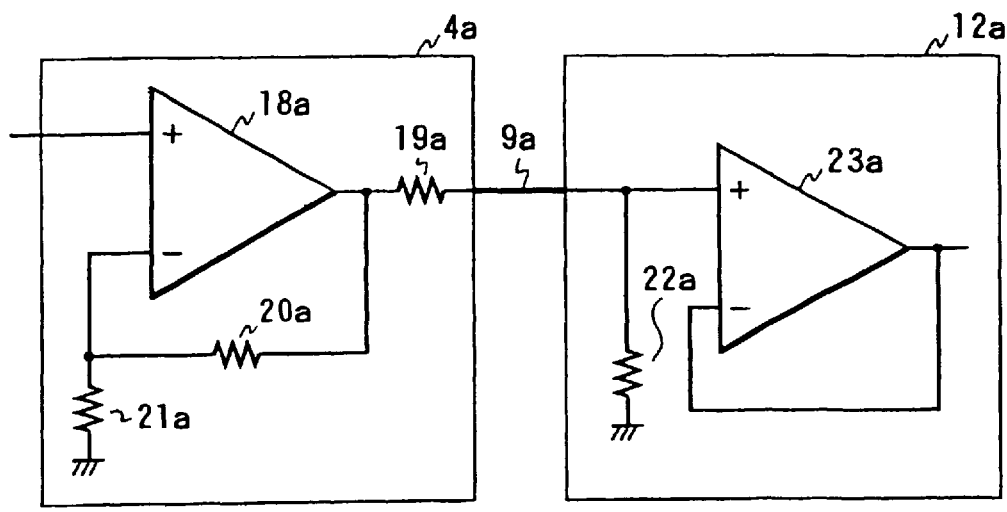
FIG. 2 is a circuit diagram showing the arrangements of a transmission buffer and a reception buffer shown in FIG. 1.
Figure 4:
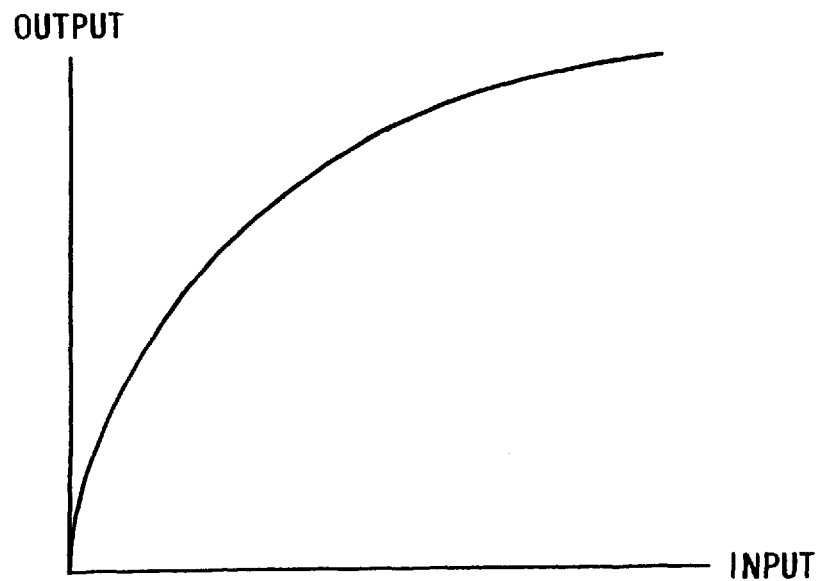
FIG. 4 is a graph showing the γ conversion table data of a look-up table shown in FIG. 3.
Figure 3:
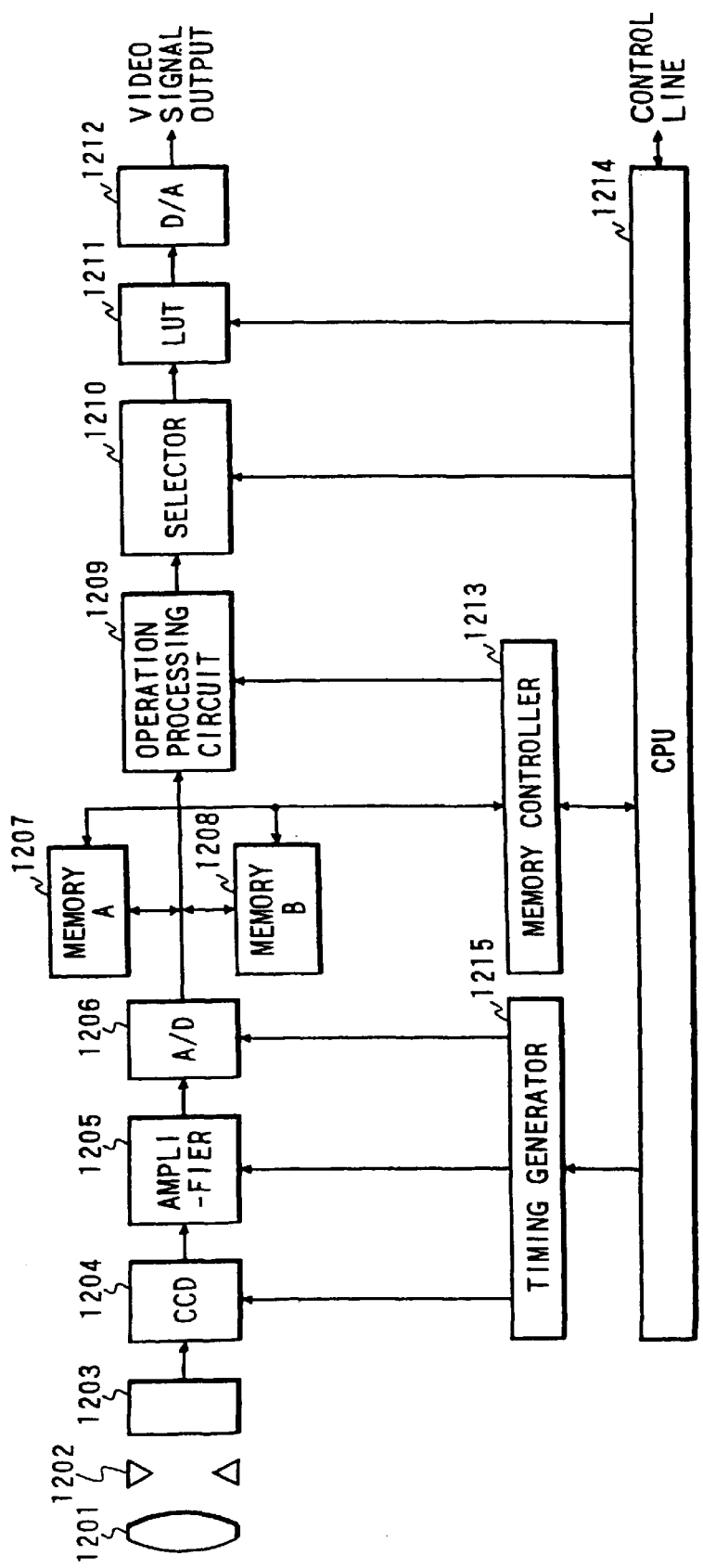
FIG. 3 is a block diagram showing the arrangement of a conventional image input apparatus.
Figure 5:
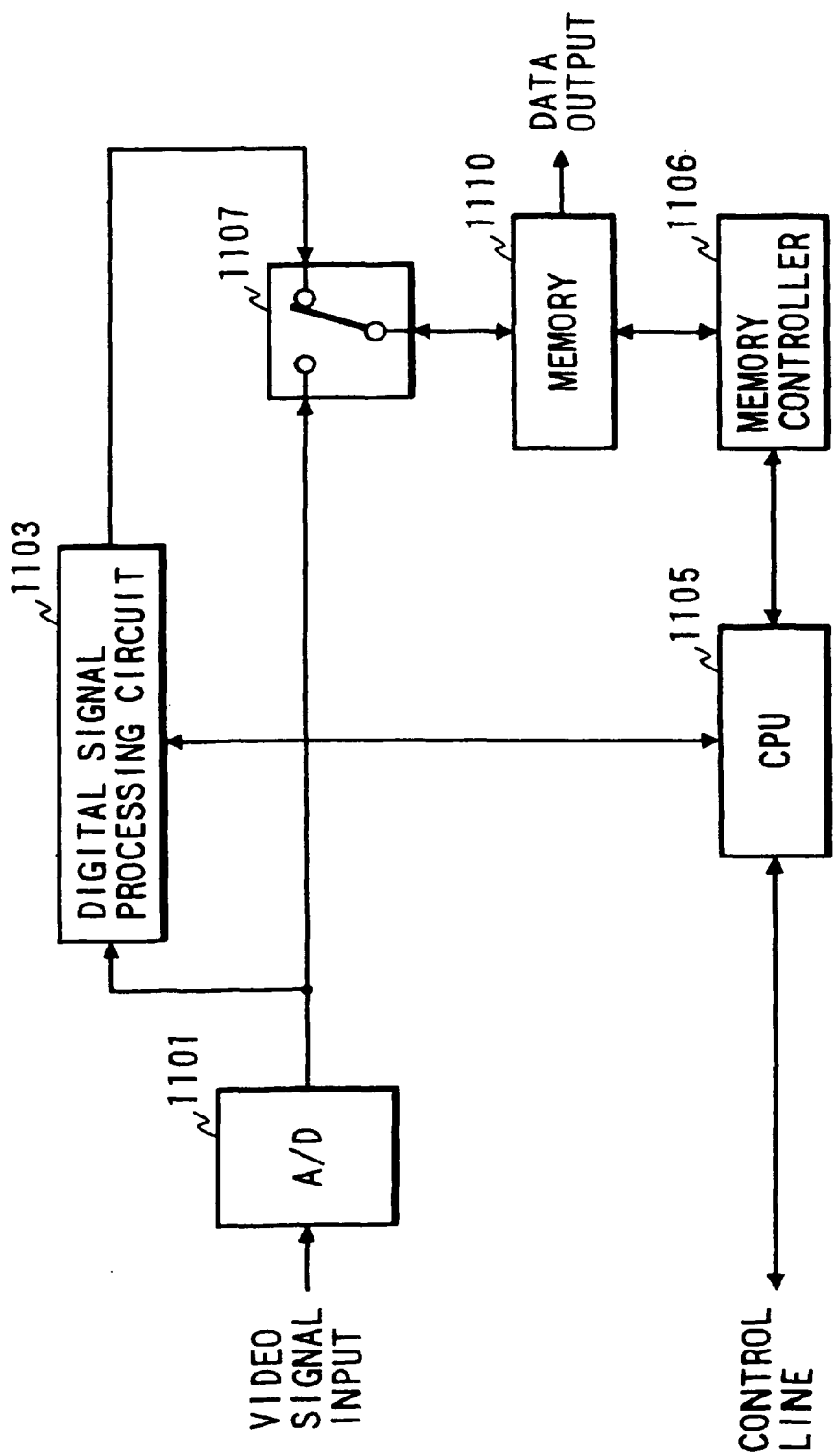
FIG. 5 is a block diagram showing the arrangement of an image processing apparatus.
Figure 28:
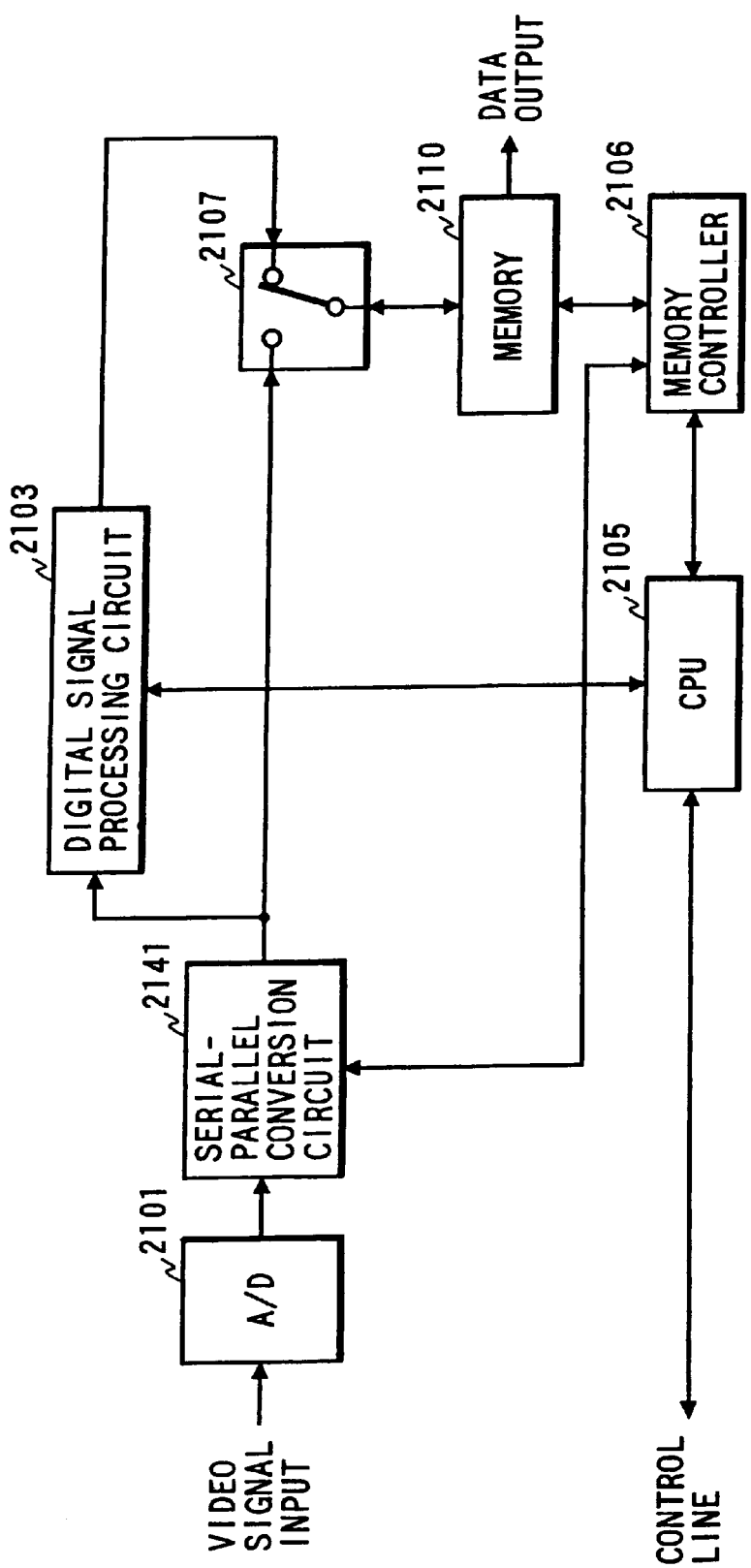
FIG. 28 is a block diagram showing the arrangement of an image processing apparatus according to still another embodiment of the present invention.

FIG. 28 is a block diagram showing the arrangement of an image processing apparatus according to still another embodiment. As in the embodiment shown in FIG. 17, an image input apparatus and an image processing apparatus are connected to each other via a video signal line and a control line. The image input apparatus has the same arrangement as that of the conventional apparatus, as shown in FIG. 3. The image processing apparatus of this embodiment comprises a S/P conversion circuit 2141 in place of the LUT 2102.

In the image input apparatus shown in FIG. 3, image data read out from a memory A 1207 is divided in units of 2 bits, and the divided data are sent to an LUT 1211. Since each 2-bit data assumes one of values "00", "01", "10", and "11, these four values need only be converted by the LUT 1211 into values suitable for transmission via the video signal line. In this embodiment, 2-bit data "00", "01", "10", and "11" are transmitted as values "0", "96", "160", and "224" in turn.

The table-converted data are converted into an analog signal by a D/A conversion circuit 1212 in FIG. 3, and the analog signal is sent to the image processing apparatus shown in FIG. 28 via the video signal line. The transmitted data is re-converted into a digital signal by an A/D conversion circuit 2101 shown in FIG. 28 to reconstruct 8-bit data.

The data converted into the digital value is sent to the subsequent S/P conversion circuit 2141. FIG. 29 is a block diagram showing the arrangement of the S/P conversion circuit. The four value levels, i.e., "0", "96", "160", and "224" sent from the video signal line are converted into digital values as 8-bit data, i.e., 00000000, 01100000, 10100000, and 11100000 in binary notation.

Upper 2 bits are extracted from the 8-bit data, and need only be re-converted into 2-bit divided data upon data transfer. Upper 2 bits D7 and D6 as 2-bit data are output from the A/D conversion circuit, and are serially input in turn to shift registers shown in FIG. 29 as original 2-bit data. That is, 2-bit data is sent four times to the shift registers. After 8 bits data are completed, a data set signal (DS) is supplied to a memory controller 2106, and the 8-bit data is written in a memory 2110. By repeating this operation, image data is written in the memory 2110.

As described above, according to the image processing apparatus of this embodiment, data transfer as in the embodiment shown in FIG. 17 can be realized by the circuit arrangement having a smaller number of parts.

In this embodiment, 8-bit data is divided into 2-bit data, and the divided data are transferred as in the embodiment shown in FIG. 17. Alternatively, the number of bits to be divided may be decreased, and data may be transferred in units of bits. The present invention is not limited to 8-bit data, and may be applied to data transfer of an arbitrary number of bits.

According to the image processing apparatus of the present invention, image data can be transferred at high speed without impairing the quality.

Data can be divided in units of bits in correspondence with the state.

Data divided in units of bits can be easily managed.

Since the LUT is calibrated by measuring the data transfer quality, data transfer can be performed more accurately.

The circuit arrangement can be simplified.

Many widely different embodiments of the present invention may by constructed without departing from the spirit and scope of the present invention. It should be understood that the present invention is not limited to the specific embodiments described in the specification, except as defined in the appended claims.

What is claimed is:

1. An image processing apparatus comprising:
   (A) divisional output means for receiving digital image data, dividing the input digital image data in units of a predetermined number of bits, and outputting the divided data;
   (B) data conversion means for receiving the data each having the predetermined number of bits output from said divisional output means, and outputting conversion data corresponding to the input data;
   (C) digital/analog conversion means for converting the conversion data output from said data conversion means into an analog signal, and outputting the analog signal;
   (D) analog signal transmission means for transmitting the analog signal output from said digital/analog conversion means via a transmission path;
   (E) receptions means for receiving the analog signal transmitted from said analog signal transmission means via the transmission path;
   (F) analog/digital conversion means for converting the analog signal received by said reception means into digital data, and outputting the digital data; and
   (G) data inverse conversion means for receiving the digital data output from said analog/digital conversion means, and outputting the data before conversion in said data conversion means corresponding to the input digital data.

2. An apparatus according to claim 1, wherein said data inverse conversion means includes serial input/parallel output means.

3. An apparatus according to claim 1, wherein said divisional output means is arranged to divide the input digital image data into data each having a predetermined number of bits, to parallelly arrange a predetermined number of divided bit data, and to output the divided bit data in turn from a most significant bit or a least significant bit.

4. An apparatus according to claim 1, wherein said divisional output means is arranged to divide the input digital image data into data each having a predetermined number of bits, to parallelly arrange a predetermined number of divided bit data, to form planes of the divided bit data in a direction of a most significant bit or a least significant bit, and to output the divided bit data.

5. An apparatus according to claim 1, further comprising calibration data generation means for generating calibration data and supplying the calibration data to said digital/analog conversion means, and wherein said data inverse conversion means optimizes inverse conversion processing of data on the basis of the calibration data generated by said calibration data generation means.

6. An apparatus according to claim 1, further comprising:
   (H) image sensing means for sensing an object image, and outputting an image signal corresponding to the sensed object image; and
   (I) analog/digital conversion means for converting the image data output from said image sensing means into digital image data, and supplying the digital image data to said divisional output means.

7. An image processing method comprising the steps of:
   (A) receiving input digital image data;
   (B) dividing the input digital image data into data each having a predetermined number of bits;
   (C) outputting the divided data;
   (D) receiving the output data each having the predetermined number of bits;
   (E) outputting conversion data corresponding to the received data;
   (F) converting the conversion data into an analog signal, and outputting the analog signal;
   (G) transmitting the analog signal via a transmission path;
   (H) receiving the analog signal transmitted via the transmission path;
   (I) converting the analog signal into digital data, and outputting the digital data; and
   (J) receiving the digital data and outputting said divided data.

8. The method of claim 7, wherein said step of receiving the digital data and outputting said divided data includes serial input of data and parallel output.

9. The method of claim 7, with said steps of receiving input digital image data, dividing the input digital image data into data each having a predetermined number of bits and outputting the divided data, further comprising:
   (A) dividing the input digital image data into data each having a predetermined number of bits;
   (B) parallelly arranging a predetermined number of divided bit data; and
   (C) outputting the divided bit data in turn from a most significant bit or a least significant bit.

10. The method of claim 7, with said steps of receiving input digital image data, dividing the input digital image data into data each having a predetermined number of bits and outputting the divided data further comprising:
    (A) dividing the input digital image data into data each having a predetermined number of bits;
    (B) parallelly arranging a predetermined number of divided bit data;
    (C) forming planes of the divided bit data in a direction of a most significant bit or a least significant bit; and
    (D) outputting the divided bit data.

11. The method of claim 7, further comprising generating and supplying calibration data, for use in said steps of converting the conversion data into an analog signal, and outputting the analog signal, wherein the step of receiving the digital data and outputting said divided data is optimized on the basis of the generated calibration data.

12. The method of claim 7, further comprising:
    (A) sensing an object image;
    (B) outputting an image signal corresponding to the sensed object image;
    (C) converting the output image signal into digital image data; and
    (E) outputting the digital image data for use in said divisional output method.

* * * * *